US012719133B2

(12) United States Patent
Glück et al.

(10) Patent No.: US 12,719,133 B2

(45) Date of Patent: Aug. 25, 2026

(54) APPARATUS AND METHOD FOR MANUFACTURING WRAPPED Z-FOLDED CELL STACKS

(71) Applicant: GROB-WERKE Gmbh & Co. KG, Mindelheim (DE)

(72) Inventors: Moritz Glück, Weilheim (DE); Tobias Schatz, Bad Grönenbach (DE); Michael Rathgeb, Augsburg (DE); Florian Guggenmos, Hasberg (DE)

(73) Assignee: GROB-WERKE GMBH & CO. KG, Mindelheim (DE)

( * ) Notice: Subject to any disclaimer, the term of this patent is extended or adjusted under 35 U.S.C. 154(b) by 657 days.

(21) Appl. No.: 18/194,992

(22) Filed: Apr. 3, 2023

(65) Prior Publication Data

US 2023/0318134 A1 Oct. 5, 2023

(30) Foreign Application Priority Data

Apr. 4, 2022 (DE) ......................... 102022108035.8
Apr. 4, 2022 (DE) ......................... 102022108036.6
May 11, 2022 (EP) .................................... 22172822

(51) Int. Cl.
*H01M 50/406* (2021.01)
*H01M 10/04* (2006.01)

(52) U.S. Cl.
CPC ..... *H01M 50/406* (2021.01); *H01M 10/0404* (2013.01); *H01M 10/0459* (2013.01); *H01M 10/0468* (2013.01)

(58) Field of Classification Search
CPC ............ H01M 50/406; H01M 50/466; H01M 2220/20; H01M 10/0404; H01M 10/0459;
(Continued)

(56) References Cited

U.S. PATENT DOCUMENTS

2008/0305398 A1* 12/2008 Komiya .............. H01M 10/058 429/246
2012/0110836 A1* 5/2012 Oh .................... H01M 10/0459 29/730

(Continued)

FOREIGN PATENT DOCUMENTS

DE 102007057129 A1 6/2009
DE 102012000616 A1 10/2012

(Continued)

OTHER PUBLICATIONS

Extended European Search Report from European priority application No. EP 22172822.3, dated Nov. 9, 2022.

*Primary Examiner* — Adam J Francis

(74) *Attorney, Agent, or Firm* — Greer, Burns & Crain, Ltd.

(57) ABSTRACT

A method and an apparatus for manufacturing Z-folded cell stacks. First and second cell components are alternately stacked while a separator web is inserted in between in a Z-shaped or meandering manner and is subsequently wrapped one more time around the cell stack thus obtained. Wrapping is performed at least in part in parallel with a previously obtained cell stack while stacking of the next cell stack is performed. A supply of the separator web required for wrapping is provided in a separator buffer storage, is cut off and held at the trailing end, in the conveying direction, with a separating gripper and is fed with the separating gripper during wrapping.

7 Claims, 12 Drawing Sheets

(58) Field of Classification Search
CPC ........... H01M 10/0468; H01M 10/052; H01M 10/0413; H01M 10/0431; H01M 10/0583; Y02P 70/50
See application file for complete search history.

(56) References Cited

U.S. PATENT DOCUMENTS

| | | | | |
|---|---|---|---|---|
| 2012/0110839 | A1 | 5/2012 | Nishio et al. | |
| 2014/0237808 | A1* | 8/2014 | Nakakuki ......... | H01M 10/0459 29/730 |
| 2016/0006079 | A1* | 1/2016 | Chen ................. | H01M 10/0583 29/623.3 |
| 2019/0229360 | A1* | 7/2019 | Böhm ............... | H01M 10/0404 |
| 2020/0153016 | A1* | 5/2020 | Hong .................. | H01M 8/0273 |
| 2021/0071045 | A1 | 3/2021 | Arzt et al. | |
| 2022/0216503 | A1 | 7/2022 | Scheb et al. | |

FOREIGN PATENT DOCUMENTS

| | | | |
|---|---|---|---|
| DE | 10201200615 | A1 | 7/2013 |
| DE | 102017131345 | A1 | 6/2019 |
| DE | 102018200958 | A1 | 7/2019 |
| EP | 2149927 | A1 | 2/2010 |
| EP | 2557626 | A2 | 2/2013 |
| EP | 2770569 | A2 | 8/2014 |
| EP | 2866293 | A1 | 4/2015 |
| EP | 3415265 | A1 | 12/2018 |
| KR | 100832801 | B1 | 5/2008 |
| WO | 2020192845 | A1 | 10/2020 |
| WO | 2020216758 | A1 | 10/2020 |

* cited by examiner

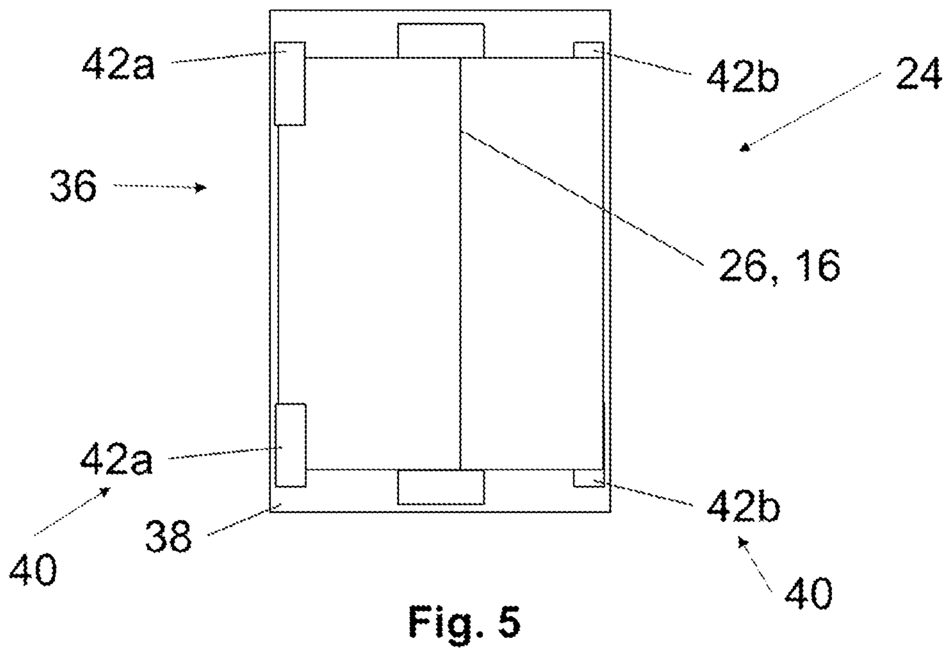
Fig. 5
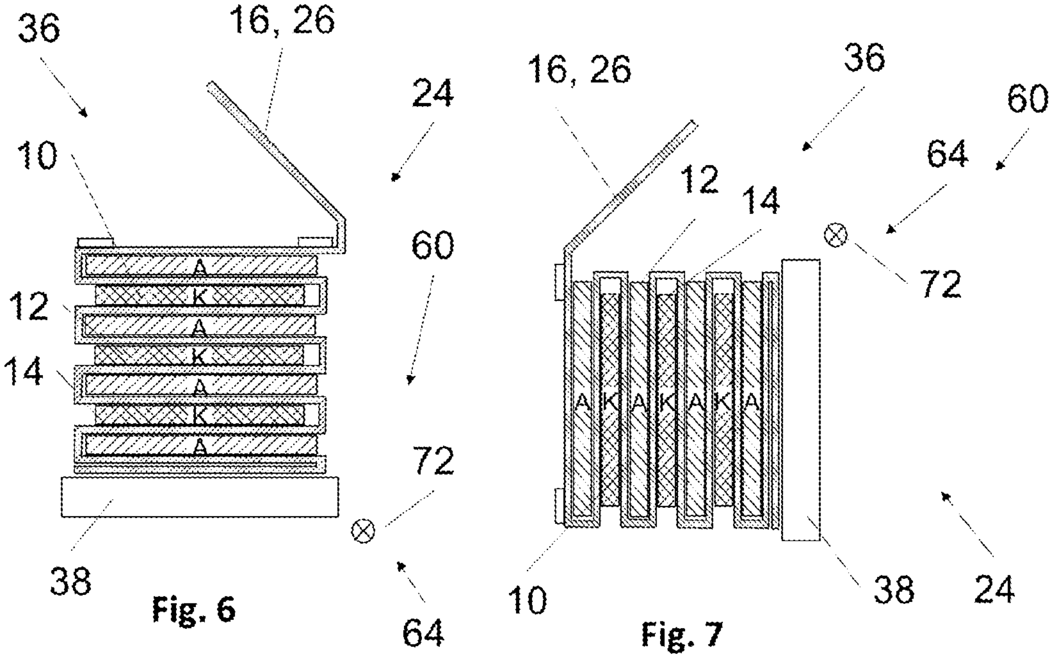
Fig. 6
Fig. 7

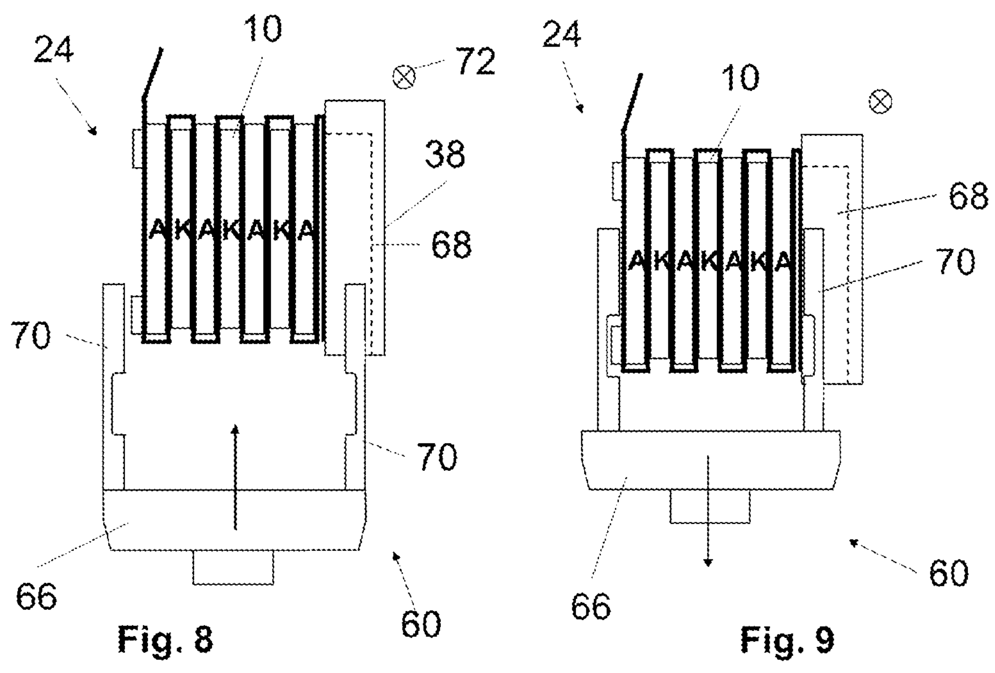
Fig. 8
Fig. 9
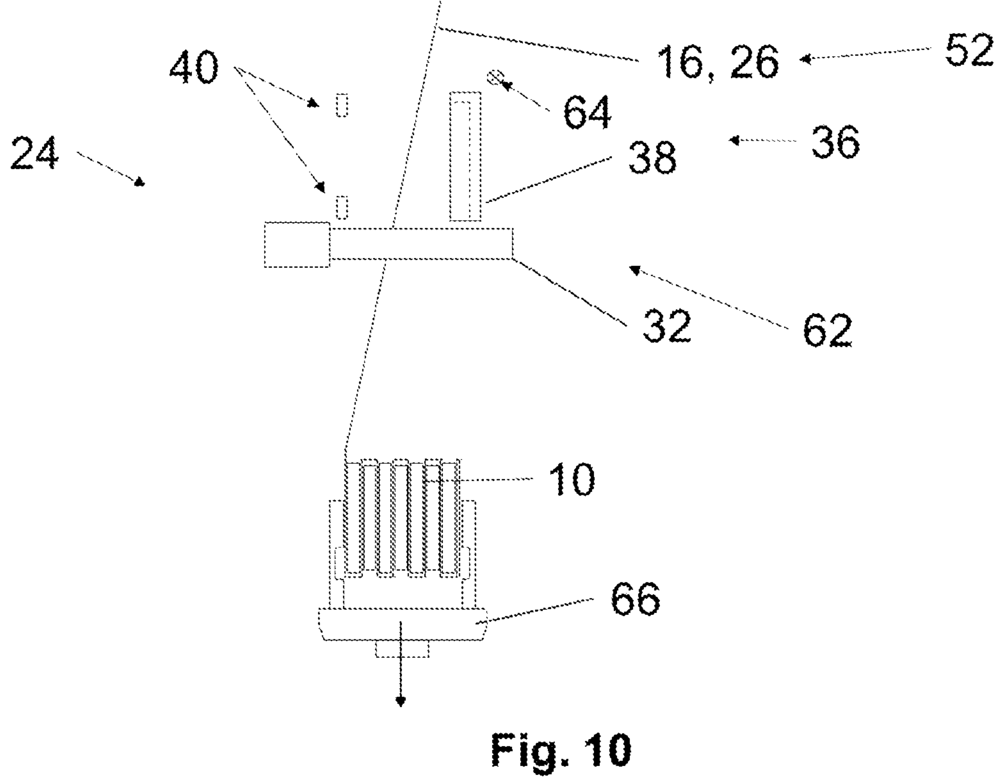
Fig. 10

24
16, 26
94-1
96a
93
104
102
96b
10
70
54
66
60

16, 26
94-1, 96a
10
93
104
54
94-1, 96b
60
66
70

16, 26
10
106
106
107
93
54
66
24
60

APPARATUS AND METHOD FOR MANUFACTURING WRAPPED Z-FOLDED CELL STACKS

CROSS-REFERENCES TO RELATED APPLICATIONS

This application claims the benefit of German Patent Application Number DE 102022108035.8 filed on Apr. 4, 2022, German Patent Application Number DE 102022108036.6 filed on Apr. 4, 2022, and European Patent Application Number EP 22172822.3, the entire disclosures of which are incorporated herein by way of reference.

FIELD OF THE INVENTION

The invention relates to a method for manufacturing Z-folded cell stacks. The invention further relates to an apparatus for manufacturing Z-folded cell stacks.

The invention relates to the field of manufacturing cell stacks, for example, for electrode assemblies and particularly for battery cells and cell composites therefor. More particularly, the invention concerns the technical field of large-scale production lines of battery cells or similar cell composites. In particular, battery cells or the like for use in electromobility, especially battery cells or the like for the main power supply of electric vehicles, such as in particular passenger cars and trucks, are to be produced in large series.

BACKGROUND OF THE INVENTION

For the technological background, reference is made to the following literature:

[1] EP 2 866 293 B1
[2] EP 2 557 626 B1
[3] KR 100832801 B1
[4] DE 10 2007 057 129 B4
[5] EP 3 415 265 A1
[6] DE 10 2017 131 345 A1
[7] WO 2020/216758
[8] WO 2020/192845 A1
[9] EP 2 149 927 A1
[10] DE 10 2012 000 615 A10
[11] DE 10 2012 000 616 A1
[12] https://www.youtube.com/watch?v=oKiR9sIStLo
[13] https://www.youtube.com/watch?v=YAedsOH-VXo
[14] https://www.youtube.com/watch?v=Y4RapyzqG4w
[15] DE 10 2018 200 958 A1
[16] US 2012/0110839 A1
[17] EP 2 770 569 A2

SUMMARY OF THE INVENTION

Embodiments of the invention are particularly concerned with an apparatus and a method for Z-folding and subsequent wrapping of cell components.

It is an object of the invention to provide an apparatus and a method for Z-folding and wrapping cell components, in particular for a battery cell or the like, where process safety is increased.

To achieve this object, the invention provides an apparatus and a method as defined in one or more embodiments described herein. Advantageous designs are the subject of additional embodiments.

In a first aspect, the invention provides a method for manufacturing Z-folded cell stacks, the method comprising:

a) providing first and second cell components and providing a separator web, b) alternately stacking the first and second cell components while interposing said separator web in a Z-shape or meandering manner such that it is folded around a previously placed cell component on a first side and then around a subsequently placed cell component on a second side opposite the first side to thus obtain a cell stack;

d) providing a length portion of the separator web in a separator buffer storage;

e) severing the separator web (26) at the trailing end (20), in the conveying direction, of the length portion (58) by means of a movable separating gripper (32) and holding the separation point (82) in the region of the trailing end (20) by means of the separating gripper (32), and f) wrapping the length portion (58) of the separator web obtained in step d) around the cell stack obtained in step b), the separating point (82) being fed by means of the separating gripper (32) holding it;

wherein step f) is performed at least partially in parallel on a previously obtained cell stack while step b) is performed to obtain the next cell stack.

Preferably, step e) also comprises holding the leading separation point, in particular as the start of the next folding process. It is thus also preferable to hold the separation point on the other side of the cutting point, in particular by means of a hold-down device on a stacking table or other stacking device.

Preferably, step e) comprises the step:

e1) moving the first and second gripper elements of the separating gripper towards each other to engage the separator web in between and moving a cutting edge of the separating gripper relative to the first and/or second gripper element to severe the separator web.

Preferably, step e) comprises the step:

e2) moving, towards a separator web, a holding and cutting unit of the separator gripper, which unit has a cutting edge and a gripping element designed in particular as a clamping bar movable to the cutting edge and preloaded while leading the cutting edge, in order to hold the separator web between the gripping element and an abutment and to perform severing while advancing the cutting edge via the gripping element resting against the abutment and the separator web.

Preferably, step f) comprises the step:

f1) tensioning the separator web. Preferably, the separator web is tensioned with variable web length. Preferably, tensioning takes place using an elastic tensioning unit. For example, deflection units on the separator buffer storage can be designed to be elastically yielding. For example, alternatively or additionally, a part of the elastic tensioning unit can be assigned to the separating gripper.

Preferably, step f) comprises the step:

f2) adjusting, maintaining, regulating and/or controlling the web tension of the separator web during wrapping.

Preferably, step f) comprises the step:

f3) elastically preloading the separating gripper for tensioning the separator web.

Preferably, step f) comprises the step:

f4) variable adjustment of a counterforce to keep the web tension constant during the entire wrapping process, at an additional rotary bearing of the separating gripper, in particular via a mechanical or pneumatic spring.

Preferably, the method comprises the step:

c) transferring the cell stack from a stacking device to a wrapping device. Preferably, in step c), the cell stack is moved through between the open gripper elements of the separating gripper. In a preferred design, for this purpose, the cell stack is moved through between a clamping bar and an abutment (examples of gripper elements) of the separating gripper in step c).

Preferably, the method comprises the step:

g) fixing a separation point of the separator web to the wrapped cell stack.

Preferably, the method comprises, in particular as a part of step g), the step:

g1) feeding the separation point to the wrapped cell stack by means of the separating gripper.

Preferably, the method comprises, in particular as a part of step g), the step:

g2) applying a fluid flow to avoid or at least reduce folds.

Preferably, the method comprises, in particular as a part of step g), the step:

g3) smoothing an end region of the separator web, preferably using at least one roller or a leading round element. As an alternative or additionally, the smoothing of the end region can also take place by means of a sliding surface.

Preferably, the method comprises, in particular as a part of step g), the step:

g4) fixing an end portion of the separator web on the wrapped cell stack, preferably by applying at least one adhesive strip.

Preferably, the method comprises, in particular as a part of step g), the step:

g5) transfer of the wrapped cell stack to downstream processes, preferably with the cell components substantially vertically aligned.

Preferably, the length portion provided in the separator buffer storage can be variably set.

Preferably, the method, more particularly step d), comprises the step:

d1) forming at least one loop of the separator web by means of deflection rollers movable relative to each other as a supply for wrapping in step f).

Preferably, the method, more particularly step d), comprises the step:

d2) building up a supply of the separator web for wrapping in step f), step d2) being performed temporally and/or spatially between step b) and step f).

It is preferred that step b) is carried out using a stacking device and step f) is carried out using a wrapping device, said stacking device and said wrapping device being spatially arranged one above the other, at least partially. In other designs, the stacking device and the wrapping device can also be arranged spatially next to each other, at least partially.

Preferably, the method comprises the step:

c) transferring the cell stack from a stacking device to a wrapping device.

Preferably, the method, more particularly step c), comprises the step:

c1) tilting the cell stack from a stacking position in which the cell components are substantially horizontally aligned into a transfer position in which the cell components are substantially vertically aligned.

When the cell stack is tilted, it is clamped on the table or other support by means of hold-down fingers or the like (example of holding element).

Preferably, the method, more particularly step c), comprises the step:

c2) trailing the separator web during a transfer of the cell stack from step b) to step e).

Preferably, the method, more particularly step c), comprises the step:

c3) holding the cell stack on a movable support by means of a holding element movable between a holding position and a release position and moving the cell stack, which is held in particular by clamps, together with the support.

Preferably, step f) comprises:

f1) engaging the cell stack by means of a wrapping gripper.

Preferably, step f) comprises:

f2) rotating the cell stack to wrap the separator web around it.

Preferably, step f) comprises:

f3) adjusting, maintaining, regulating and/or controlling the web tension of the separator web during wrapping.

Preferably, step f) comprises:

f4) elastic tensioning of the separator web.

Preferably, step f) comprises:

f5) emptying a separator buffer storage containing a supply of the separator web for wrapping.

Preferably, step f) comprises:

f6) feeding a support for a separation point of the separator web.

In particularly preferred designs it is provided that the cell stack is always in a mechanically clamped state. This reduces the risk of losing accuracy, because the electrodes slip relative to each other, which is partly due to the fact that the cell components, such as the anode electrode and cathode electrode, often have different sizes.

It is therefore preferred that the cell stack is mechanically clamped to maintain the position of the cell components in the cell stack at least during all transfers and movements until the final fixation by applying a tape after wrapping.

According to a further aspect, the invention provides an apparatus for manufacturing Z-folded cell stacks, the apparatus comprising:

a stacking device for alternately stacking a first and a second cell component to form a cell stack, the stacking unit comprising a separator web insertion device for inserting a separator web between cell components in a Z-shaped or meandering manner such that the separator web is alternately folded around a previously placed cell component on a first side and is then folded around a subsequently placed electrode on a second side opposite the first side, a wrapping device for wrapping the separator web around the cell stack stacked by means of the stacking device, a separating gripper designed for separating the separator web at a trailing end, in the separator web conveying direction, of a supply of the separator web to be used for wrapping around the cell stack and designed for holding the separation point at the trailing end, the separator gripper being movable for feeding the held separation point, and a control unit, wherein the apparatus is configured to perform the process of wrapping the separator web around a previously obtained cell stack in the wrapping device at least partially in parallel with the process of stacking a next cell stack in the stacking device.

It is preferred that the separating gripper includes a cutting device for severing the separator web and gripper elements for holding the separation point.

It is preferred that the cutting device has a cutting edge and drive unit for moving the cutting edge to severe the separator web, wherein a gripper element designed in particular as a clamping bar is leading the cutting edge in a resilient manner.

It is preferred that the cutting edge, for holding and severing, is movable towards another gripper element formed as an abutment in order to fix the separator web between the gripper element resiliently disposed upstream of the cutting edge and the abutment and to severe the separator web by a continued movement of the cutting edge.

It is preferred that the control unit is configured for controlling a movement of the separating gripper in such a manner that the separating gripper with the separation point of the separator web held on it is fed during wrapping.

It is preferred that the control unit is configured for controlling a movement of the separating gripper in a way such as to maintain, regulate and/or control a web tension of the separator web held by the separating gripper during wrapping.

It is preferred that the separating gripper includes an additional rotary bearing and a preloading device for preloading (applying an elastic force to) the separating gripper in one of the directions of rotation of the rotary bearing in order to keep a web tension of the separator web held on the separator gripper constant during wrapping.

Preferably, the apparatus further comprises a holding device for holding the leading separation point in the conveying direction of the separator web, from which the separation point of the length portion cut off and held by the separating gripper has been cut off. Preferably, this allows to start stacking of the next cell stack right away while the previously stacked cell stack is being wrapped. In other words, the holding device is designed for holding the leading end in the conveying direction of the separator web at the cutting point on the other side of the separation point. The holding device preferably comprises hold-down fingers or the like on a stacking table or the like.

Preferably, the apparatus comprises a separator buffer storage for buffering a supply or length portion of the separator web to be used for the wrapping process in the wrapping device. The separator buffer storage is preferably arranged between the stacking device and the wrapping device and/or comprises deflection rollers movable relative to each other to build up at least one loop of the separator web as a supply.

According to the invention, the apparatus comprises a separating and holding device for separating the separator web at a trailing end, in the separator web conveying direction, of a supply of the separator web to be used for wrapping around the cell stack and for holding the separation point at the trailing end. The separating and holding device is movable for feeding the held separation point. The separating and holding device comprises the separating gripper with the cutting device and the gripper elements.

Preferably, the apparatus comprises a transfer device for transferring the cell stack from the stacking device to the wrapping device. The transfer device is preferably configured to tilt the cell stack from a stacking position in which the cell components are substantially horizontally aligned for stacking into a transfer position in which the cell components are substantially vertically aligned. The transfer device is preferably configured to trail the separator web when transferring the cell stack from the stacking device to the wrapping device.

It is preferred that the stacking device and the wrapping device are spatially arranged one above the other, at least partially. In other designs it is provided that the stacking device and the wrapping device are spatially arranged next to each other, at least partially.

It is preferred that the wrapping devices includes at least one rotatable wrapping gripper for gripping the cell stack and for rotating the cell stack to wrap the separator web around. The wrapping gripper preferably includes at least one fork-like gripper element.

It is preferred that the wrapping device includes a web tensioning unit for adjusting, maintaining, regulating and/or controlling the web tension of the separator web during wrapping. In preferred designs, the belt tensioning unit comprises the separating gripper with its associated movement apparatus and the corresponding part of the control unit. Further elements of the web tensioning unit can be configured as a part of the separator buffer storage, its actuators and the corresponding part of the control unit.

Preferably, the apparatus comprises a fluid flow applicator unit for applying a fluid flow to an end region of the separator web to avoid or at least reduce folds.

Preferably, the apparatus comprises a smoothing unit for smoothing an end region of the separator web. The smoothing unit preferably comprises at least one roller or a leading round element for smoothing and/or at least one sliding surface for smoothing.

Preferably, the apparatus comprises a positioning and/or fixing unit for positioning and/or fixing the end region of the separator web to the wrapped cell stack. Preferably, the positioning and/or fixing unit is configured to apply at least one adhesive strip for fixing the end region.

It is preferred that the control unit is configured to control the apparatus for carrying out the method according to any of the above-described configurations.

According to a further aspect, the invention provides a computer program comprising instructions causing the apparatus according to any of the above-described configurations to carry out the method according to any of the above-described configurations.

The control unit is in particular an electronic control unit and comprises more particularly a computer (in the broadest sense a programmable arithmetic unit, e.g. processor) with corresponding programs.

The method according to the above-described configurations can be carried out with any apparatus designed for performing the individual steps of the method. Preferably, the method is carried out with an apparatus according to any of the above-described configurations. The apparatus according to any of the above-described configurations is preferably used to carry out the method according to any of the above-described configurations. However, other methods of Z-wrapping can also be performed on it.

BRIEF DESCRIPTION OF THE DRAWINGS

Embodiments of the invention will now be described in more detail with reference to the attached drawings, wherein it is shown by FIG. 1 is a front view of a cell stack manufactured using one embodiment of an apparatus and a method for manufacturing Z-folded cell stacks;

FIG. 5 is a top view of the stacking device and the cell stack formed by stacking after the stacking step—the situation after the completion of the stacking process is shown;

FIG. 6 is a front view of the stacking device with the position of the cell stack after the stacking process and prior to a pivoting of a support of the stacking device;

FIG. 7 is the front view of FIG. 6, after the pivoting of the support of the stacking device performed for transferring the cell stack;

FIG. 8 is a front view of the tilted support with the cell stack together with a transfer gripper of a transfer device at the insertion of the transfer gripper;

FIG. 9 is a further sub-step of the transfer of the cell stack from the stacking device to a wrapping device, with the transfer gripper closed for clamping the cell stack;

FIG. 10 is the transfer gripper in the lower end position to illustrate a lowering of the transfer gripper through the separating gripper while simultaneously trailing a separator;

DETAILED DESCRIPTION OF THE PREFERRED EMBODIMENTS

Figure 1:
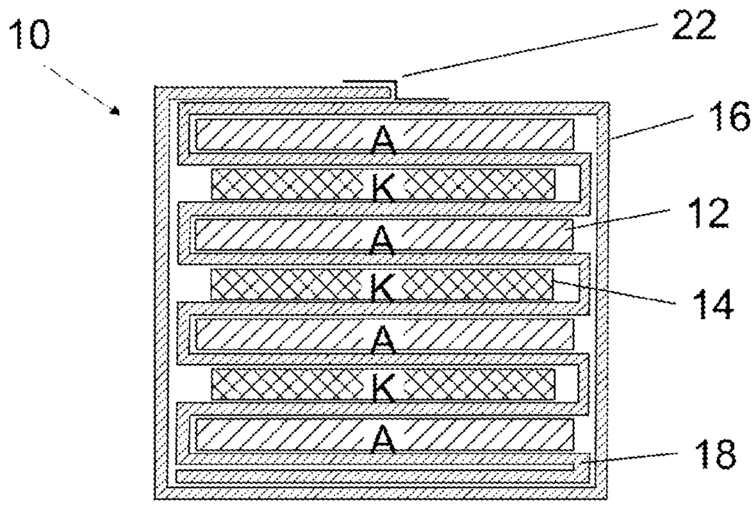

FIG. 1 shows a Z-folded and wrapped cell stack 10 for a battery. The cell stack 10 has first cell components 12 and second cell components 14 alternately stacked on top of each other and separated from each other by means of a separator 16 folded in a Z-shape or meandering shape around the cell components 12, 14. In FIG. 1, the separator 16 formed by a separator web 26 is folded around the ends or edges of the first cell component 12 shown on the left and around the ends or edges of the second cell component 14 shown on the right. For example, the cell components 12, 14 are electrodes; in some embodiments, the first cell components 12 are anodes A and the second cell components are cathodes K. As can be seen from FIG. 1, in the embodiment shown, the anodes A and cathodes K have different dimensions in the direction of extension of the separator 16.

Here, the separator 16 has an empty fold 18 below the lowest electrode A. Further, the separator 16 is once again wrapped around the entire stack of cell components 12, 14. A free end 20 of the separator 16 is fixed by means of a suitable fixing means such as an adhesive strip 22.

The cell stack shown in FIG. 1 is produced by Z-folding. Z-folding represents one of the main processes for manufacturing cell stacks 10 for battery cell assembly. Other processes include, for example, laminate stacking of monocells, wrapping or single sheet stacking.

In Z-folding, cell components 12, 14, such as anodes A and cathodes K, are alternately placed on top of each other.

The insulating layer forms the separator 16, which in this process is always placed between the layers as an endless material—separator web 26. The separator 16 is always folded around the individual electrodes A, K so that it runs in a Z-shape in the cell stack 10.

After the desired number of layers in the cell stack 10 has been achieved by alternately stacking the electrodes A, K, the separator 16 is finally wrapped around the entire cell stack 10. This ensures that the entire cell stack 10 is pre-fixed. For this purpose, it is provided that the separator 16 is fed at a constant and defined web tension during wrapping. After wrapping, the separator 16 is cut off and the end 20 is fixed to the cell stack 10 with an adhesive strip 22.

Moreover, due to the cell design and cell function, it is desirable for the cell stacks 10 under consideration here that the complete separator 16 originates from one web. Therefore, stacking and wrapping in the embodiments of the apparatus and method of manufacture illustrated herein is performed using a continuous separator 16.

Depending on the stacking and wrapping direction, it may also be desirable to include an empty fold 18. This is located either below the first layer as shown in FIG. 1 or above the last layer.

In FIG. 1, the cell stack 10 is shown after wrapping and with the adhesive strip 22 applied.

Specific features of embodiments of an apparatus 24 for manufacturing the Z-folded and wrapped cell stack 10 will be explained below. In particular, the apparatus 24 is a stacking system for large-scale production of battery cells. In addition to the process engineering challenges, other aspects are also of primary importance.

In particular, in embodiments of the apparatus 24 and a process for manufacturing that can be carried out in particular with the apparatus 24, the focus is on fast production. Economical equipment and processes should have very low cycle times; this is addressed by embodiments of the invention. In some particularly preferred embodiments, attention is also paid to the footprint of the equipment in cell production.

To reduce cycle times, individual processes in the apparatus 24 and in the method are parallelized. However, this requires that the individual processes can also occur independently of each other.

The challenge with the two processes "stacking" and "wrapping" is that the separator 16 should not be separated within a cell stack. This is achieved with apparatus 24 and methods according to embodiments of the invention.

With the method described, it is possible to greatly minimize cycle times (<50%) compared to standard methods.

Particularly preferred embodiments of the apparatus 24 and the method address another desired aspect in cell manufacturing, namely the footprint. Due to the materials used, the production of cell stacks 10 is usually performed in clean or dry rooms. For this purpose, the ambient air is conditioned so that a defined air temperature and a defined relative humidity (<0.1%) are present in the production halls. Since conditioning is only possible with a very high energy input, an attempt is made to build the production areas as small as possible. Thus, the footprint of the machinery plays an even more decisive role in cell production than in other industrial sectors.

The process described below for stacking, wrapping and separating the separator web 26 is intended to solve the challenges with a focus on cycle time and process reliability. In preferred embodiments, the challenges with respect to installation space or footprints are also solved. The focus in detail is not on the detailed design, but on the basic process.

In preferred embodiments of the apparatus 24 and the method, it is provided that the clamping of the cell stack 10 is not released at any time during the entire process to ensure that the individual layers cannot slip. This also applies to the transfer of the cell stack 10 from one process section to the next.

A special feature of the embodiments of the apparatus 24 and the process described below is the parallelization of the stacking process and the wrapping process ("wrapping") that takes place after the stacking process. By means of a separator buffer storage 28, a supply 56 of the separator 16 is built up, which is used during the wrapping step after Z-folding. Subsequently, the separator web 26 is separated by means of a separating gripper 32. Thereafter, the stacking process of Z-folding can be started for the next cell stack 10 while at the same time the preceding cell stack 10 can be wrapped.

Advantages of particularly preferred embodiments of the apparatus 24 and method are:

- parallelization of stacking and wrapping and thus large reductions in cycle time for large series production
- reduction of the installation space due to units arranged one above the other
- storage of large web lengths in a small installation space by means of a special web guiding concept
- variable web tension adjustable via mechanical or pneumatic spring
- high stacking accuracy due to continuous clamping of the cell stack.

The overall process for manufacturing the Z-folded and wrapped cell stack 10 is described below with reference to FIGS. 2 to 31. In addition, the corresponding designs of the units of the apparatus 24 for producing the Z-folded and wrapped cell stack 10 will also be explained.

Figure 2:
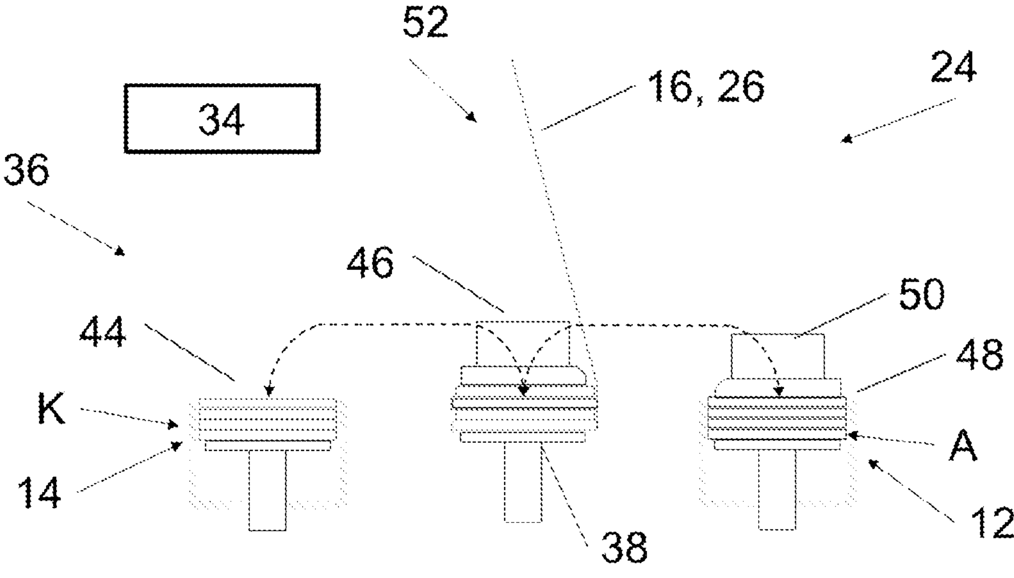
FIG. 2 is a front view of a stacking device of the apparatus and a schematic representation of the stacking step of the method.

The apparatus 24 has an electronic control unit 34, indicated in FIG. 2, with a corresponding computer program. The control unit 34 is designed to control the individual devices/units or stations of the apparatus 24, which are explained in more detail below, for carrying out the process, which is also explained in more detail below. The computer program contains the corresponding instructions for this purpose.

The apparatus 24 has a stacking device 36, an embodiment of which is shown in FIGS. 2 to 7. The stacking device 36 has a stacking table 38 (example of a support) and holding elements 40 having first and spaced second hold-down fingers 42*a*, 42*b* for holding down the stacked cell components 12, 14 during Z-folding of the separator 16. At least one hold-down finger 42*a*, 42*b* per corner region, i.e., a total of at least four hold-down fingers 42*a*, 42*b*, are provided and are movable in a direction substantially parallel to the surface of the stacking table 38 for infeed and outfeed and in a direction substantially perpendicular to the surface of the stacking table 38 for clamping and feeding in height. In some embodiments, the hold-down fingers 42*a*, 42*b* are set at a slight angle to prevent relative movement on the cell stack. Thus, the hold-down fingers 42*a*, 42*b* may be movable also at an angle to the surface of the stacking table 38.

Further, the stacking device 36 of the illustrated embodiment comprises a cathode magazine 44, a cathode gripper 46 movable back and forth between the cathode magazine 44 and the stacking table 38 for delivering cathodes K, an anode magazine 48, and an anode gripper 50 movable back and forth between the anode magazine 48 and the stacking table 38 for delivering anodes K. The magazines 44, 48 provide the first and second cell components 12, 14.

Further, the stacking device 36 comprises a separator web insertion device 52 for Z-shaped or meander-shaped insertion of the separator web 26 between the cell components 12, 14. The separator web 26 is provided for insertion by the separator web insertion device 52. By inserting the grippers 46, 50 with the cell components 12, 14 laterally from different sides in each case, the separator web insertion device 52 is further configured to fold the separator web around the cell components 12, 14 in a Z-shaped or meandering manner.

In FIGS. 2 to 5, the stacking method that can be performed by means of the stacking device 36 is shown schematically. The stacking method comprises:

a) providing the first and second cell components 12, 14 in the form of the anodes and cathodes A, K and providing the separator web 26; and b) creating the cell stack 10 by alternately placing the anodes A and cathodes K from both sides (see FIG. 2).

Figure 3:
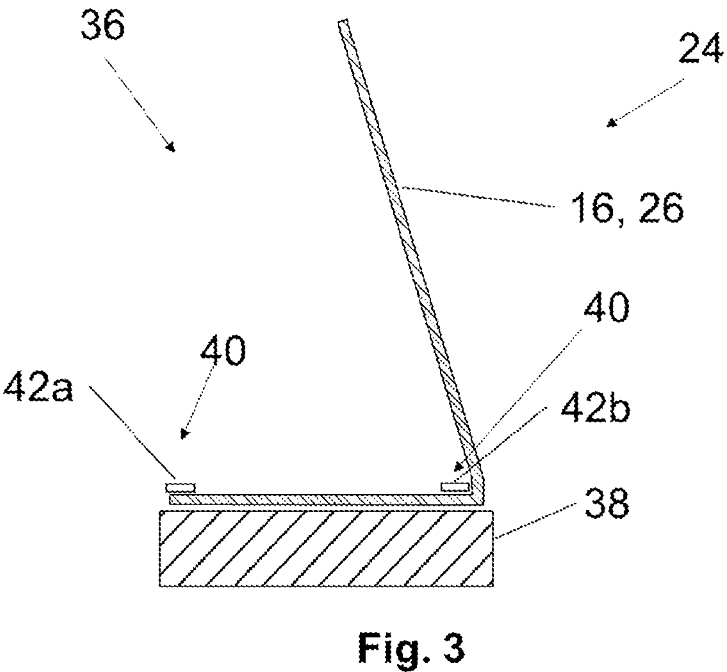
FIG. 3 is a front view of the initial situation at the stacking device prior to placing the first cell component.
Figure 4:
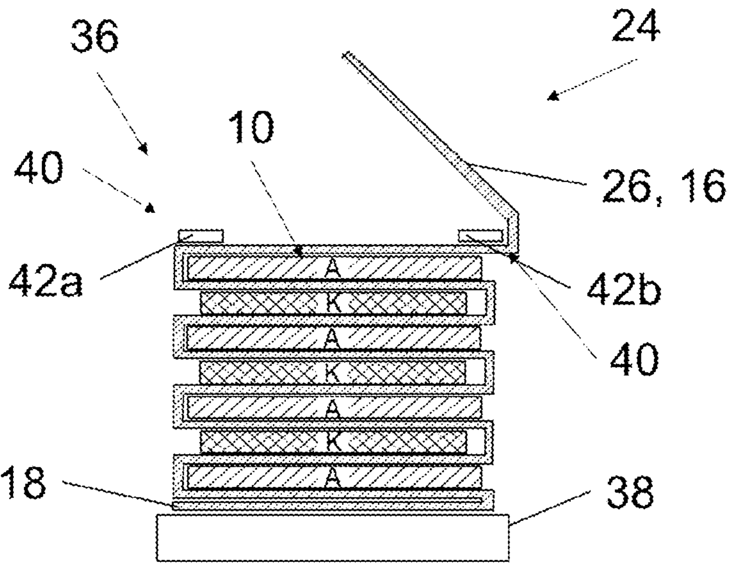
FIG. 4 is a front view of the stacking device and the cell stack formed by stacking after the stacking step—the situation after the completion of the stacking process is shown.

With reference to the illustrations in FIG. 2 to FIG. 5, the following steps in particular are carried out to generate the cell stack 10 (step b)):

b1) On the stacking table 38, the separator 16 is fixed via hold-down fingers 42*a*, 42*b* before the first layer. The separator web 26 is fed from the right side from above (see FIG. 3).

b2) Subsequently, the first anode A is inserted from the right, positioned on the stacking table 38 and then held in place via the first hold-down fingers 42*a* on the left side of the stacking table 38. At the same time, the empty fold 18 is created as the separator 16 is folded over from right to left. Note: The arrangement of anode/cathode A/K on the left or right and correspondingly empty fold 18 at the bottom/top is defined depending on the cell design.

b3) As soon as the anode A has been fixed, it is released from the anode gripper 50, and the latter moves back to the anode magazine 48.

b4) Subsequently, the cathode gripper 46 moves in from the left side with a cathode K.

b5) At the infeed movement, the separator 16 is pushed to the right and is folded over the first two hold-down fingers 42*a* on the stacking table 38.

b6) Once the cathode K has been placed, it is fixed via two second hold-down fingers 42*b* on the right-hand side of the stacking table 38 as shown in FIGS. 2 to 4.

b7) Subsequently, the first hold-down fingers 42*a* on the left side are pulled out horizontally from the separator fold that was created during the folding over.

b8) Now the cathode gripper 46 moves back to the home position and fetches the next cathode K from the cathode magazine 44. At the same time, the anode gripper 50 feeds the next anode A.

b9) Process steps b3)-b8) are now repeated until the desired number of layers has been reached.

b10) In the embodiment shown, one anode A is always placed on the stack as the last layer (as mentioned above, this depends on the cell design).

b11) After this last layer has been deposited and fixed in place by the first hold-down fingers 42*a*, the separator 16 is once again folded over the cathode gripper 46, but without depositing a cathode K.

b12) Finally, all four hold-down fingers 42*a*, 42*b* are placed on the top of the stack so that they fix the cell stack 10 (see FIG. 4 and FIG. 5).

In FIGS. 3 to 5, the cell stack 10 is shown schematically as well as the overall situation at the beginning and after step b12). To be emphasized is the side on which the continuous separator 16 is fixed by the hold-down fingers 42*a*, 42*b*, respectively. In addition, the cell stack 10 is built up in height on the stacking table 38, which also means that the hold-down fingers 42*a*, 42*b* must “grow” with it, in other words, they must be fed accordingly in the vertical direction.

In the following, the further structure of the apparatus is explained with reference to FIGS. 6 to 31.

The apparatus 24 has, as a further unit, a wrapping device 54 for wrapping the separator web 26 around the cell stack 10 stacked by the stacking device 36, which will be described in more detail hereinafter.

In the embodiments shown, the apparatus 24 further comprises the separator buffer storage 28 for temporarily storing a supply 56 of the separator web 26 to be used for wrapping in the wrapping device 54 in the form of a length portion 58 of the separator web 26.

Further, in the embodiments shown, the apparatus 24 comprises a transfer device 60 for transferring the cell stack from the stacking device 36 to the wrapping device 54.

Further, the apparatus 24 comprises a separating and holding device 62 for separating the separator web 26 at a trailing end 20, in the conveying direction of the separator web 26, of a supply 56 of the separator web 26 to be used for wrapping around the cell stack 10 and for holding the separation web 26 at the trailing end 20. The separating and holding device 62 includes the separating gripper 32.

In preferred embodiments of the apparatus 24, in order to reduce the hall space occupied by the apparatus 24 and thus to reduce the footprint, the stacking device 36 and the wrapping device 54 are at least partially arranged spatially one above the other and more preferably are arranged spatially one above the other in their entirety.

The transfer device 60, which is explained in more detail below with reference to FIGS. 6 to 10, is arranged to tilt the cell stack 10 from a stacking position with cell components 12, 14 aligned substantially horizontally for stacking into a transfer position with cell components 12, 14 aligned substantially vertically. Further, the transfer device 60 is adapted to trail the separator web 26 as the cell stack 10 is transferred from the stacking device 36 to the wrapping device 54.

Here, FIG. 6 shows a front view of the stacking device 36 with the position of the cell stack 10 after the stacking process and before a pivoting of the base of the stacking device 36, which is formed here as a stacking table 38. FIG. 7 shows the front view of FIG. 6 after the pivoting of the stacking table 38, which takes place for transferring the cell stack 10. FIG. 8 shows a front view of the tilted stacking table 38 with the cell stack 10 together with a transfer gripper 66 of the transfer device 60 during the insertion of the transfer gripper 66. FIG. 9 shows another sub-step of the transfer of the cell stack 10 from the stacking device 36 to the wrapping device 54, wherein the transfer gripper 66 is closed for clamping the cell stack 10. And FIG. 10 shows the transfer gripper 66 in a lower end position to illustrate lowering of the transfer gripper 66 through the separating gripper 32 with simultaneous trailing of a separator 16.

The transfer device 60 includes a pivoting device 64 for pivoting the stacking table 38 from a horizontal position to a vertical position, and the transfer gripper 66. The transfer gripper 66 comprises a plurality of gripper fingers 70 movable towards and away from each other, by means of which the cell stack 10 can be clamped during transfer to thus hold the cell components 12, 14 in position in the cell stack 10.

The stacking table 38 includes a recess that allows engagement of the transfer gripper 66. In particular, the recess is formed as a gripper groove 68 into which corresponding gripper fingers 70 of the transfer gripper 66 can engage.

In the following, the function of the transfer device 60 is explained in more detail with reference to FIGS. 6 to 10. The transfer device 60 is configured to perform the following step c) of the method for transferring the cell stack 10 from the stacking table 38:

c) transferring the cell stack 10 from the stacking device 36 to the wrapping device 54.

In particular, in one embodiment of the method, step c) comprises the following steps (in the order indicated):

c0) After completion of the stacking process, the cell stack 10 is clamped via all (in this case four) hold-down fingers 42*a*, 42*b*, as shown in FIGS. 4 and 5 and FIG. 6.

c1) Subsequently, the cell stack 10 is tilted from the stacking position with cell components 12, 14 aligned substantially horizontally for stacking into a transfer position with cell components 12, 14 aligned substantially vertically, as shown in FIGS. 6 and 7. In the embodiment shown, for this purpose, following the clamping action of step c0), the stacking table 38 including the four hold-down fingers 42*a*, 42*b* is pivoted downward about the longitudinal axis of the electrodes A, K (more precisely: an axis of rotation 72 parallel to the longitudinal axes of the electrodes A, K). In the embodiment shown, the pivoting device 64 is configured to pivot the stacking table 38 about a laterally disposed axis of rotation 72. The pivoting movement is counterclockwise in the apparatus 24 (stacking system) according to the embodiment shown, but can also be set up in a mirrored manner.

In the case of special cell formats, a deflector of the or one of the cell components 12, 14 can also be located on the long side of the cell, so that in this case pivoting is performed accordingly about the short side. In the embodiments shown, the pivot axis or axis of rotation 72 is always parallel to one of the two "folding axes" of the separator 16.

c1a) Now the transfer of the cell stack 10 from the stacking table 38 can take place. For this purpose, the transfer gripper 66 moves from bottom to top and grips the cell stack 10 on the stacking table 38, see FIGS. 8 and 9.

c1b) The gripper fingers 70 are designed in such a manner that the hold-down fingers 42*a*, 42*b* are overlapped. Thus, the cell stack 10 can be clamped with the gripper fingers 70, the hold-down fingers 42*a*, 42*b* can be pulled out laterally, and then the cell stack 10 can be pulled down, see FIGS. 9 and 10.

c2) When the cell stack 10 is pulled down, the separator 16 is pulled down or trailed from above (from the material feed device of the separator web insertion device 52). In this process, the separator 16 is guided past the pivoted stacking table 38. In addition, the transfer gripper 66 dives through the separating gripper 32 for the separator 16 from the bottom to top. The separating gripper 32 is used to severe the separator web 26 before the next stacking process (cf. FIG. 10).

Now the cell stack 10 is in the position for transfer to the wrapping device 54.

Before the wrapping process (step f) of the method) is started, in a step d), a length portion 58 of the separator web 26 required in step f) for wrapping is made available in the separator buffer storage 28. For this purpose, before the wrapping process is started, the buffer system is filled, which is explained in more detail below with reference to FIGS. 11 and 12.

Figure 11:
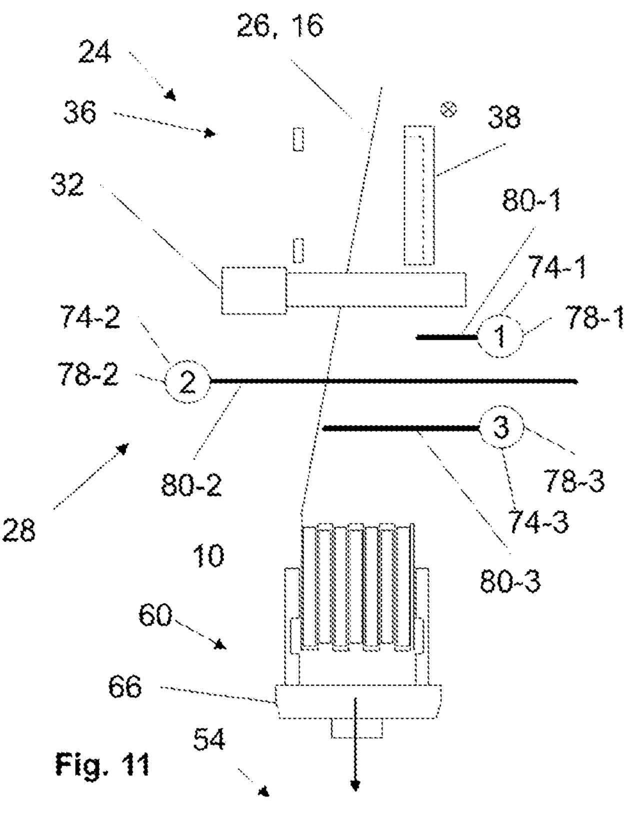
FIG. 11 is an initial situation for filling a separator buffer storage, said separator buffer storage being empty.
Figure 12:
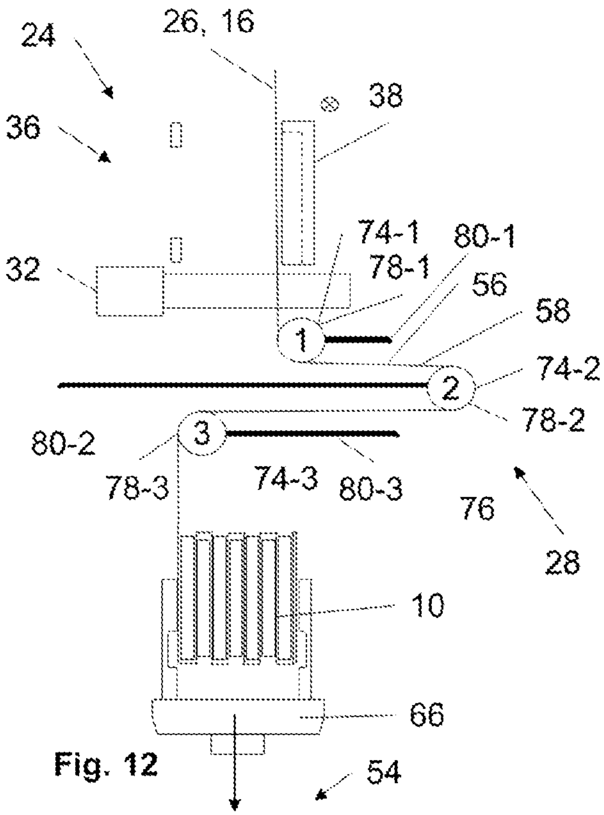
FIG. 12 is an illustration similar to FIG. 11, when the separator buffer storage is filled.

FIG. 11 shows an initial situation for filling the separator buffer storage 28. The separator buffer storage 28 is empty. FIG. 12 shows an illustration similar to FIG. 11 with the separator buffer storage 28 filled.

The separator buffer storage 28 is arranged between the stacking device 36 and the wrapping device 54. The separator buffer storage 28 has deflection rollers 74-1, 74-2, 74-3 movable relative to one another for building up at least one loop 76 of the separator web 26 as a supply 56.

In order to be able to decouple the two processes b) stacking and f) wrapping from one another in terms of time, a material storage—in this case the separator buffer storage 28—is integrated into the process and the apparatus 24. According to the embodiment shown in FIGS. 11 and 12, the separator buffer storage 28 consists essentially of three (or more) rollers 78-1, 78-2, 78-3 as deflection rollers 74-1, 74-2, 74-3, each of which can preferably be displaced horizontally. In some embodiments, at least one of the rollers 78-1, 78-2, 78-3, in particular the upper deflection roller 78-1, can also be pivoted. In this case, the upper and lower rollers 78-1, 78-3 serve as deflection rollers, and the middle roller 78-2 serves as a storage roller. The basic positions of the rollers 78-1, 78-2, 78-3 shown in FIG. 11 are defined in such a way that the transfer gripper 66 can move past them. According to FIG. 11, the deflection rollers 78-1, 78-3 are arranged for this purpose on one side, shown here on the right, and the storage roller on the other side, shown here on the left. Furthermore, displacement guides 80-1, 80-2, 80-3 for displacement of the deflection rollers 74-1 to 74-3 and rollers 78-1 to 78-3, respectively, controlled by the control unit 34, are also shown in FIGS. 11 and 12.

The separator buffer storage 28 is filled by installing the separator 16 over the three deflection rollers 74-1 to 74-3. Depending on the cell format and the number of required wraps, a corresponding length portion 58 with a corresponding web length can be stored in the separator buffer storage 28.

FIG. 11 shows the basic position and FIG. 12 shows the filled position. Note: The separator buffer storage 28 is preferably designed in such a way that, in the basic position, the separating gripper 32 can also move downwards in order to carry out the advantageous embodiment of the wrapping process described below (step f)).

Accordingly, the method comprises the following step d):

d) providing a length portion 58 of the separator web 26 required in step f) for wrapping in the separator buffer storage 28.

Step d) preferably comprises the steps of:

d1) forming at least one loop 76 of the separator web 26 by means of deflection rollers 74-1 to 74-3 movable relative to each other as a supply 56 for wrapping in step f); and d2) building up the supply 56 of the separator web 26 for wrapping in step e), wherein step d2) is carried out temporally and/or spatially between step b) and step f).

Furthermore, the method according to the embodiment shown here comprises the step to be carried out by means of the separating and holding device 62, which is explained in more detail below with reference to FIGS. 13 to 16:

eb) separating the separator 16 and starting a new stacking process.

Figure 15:
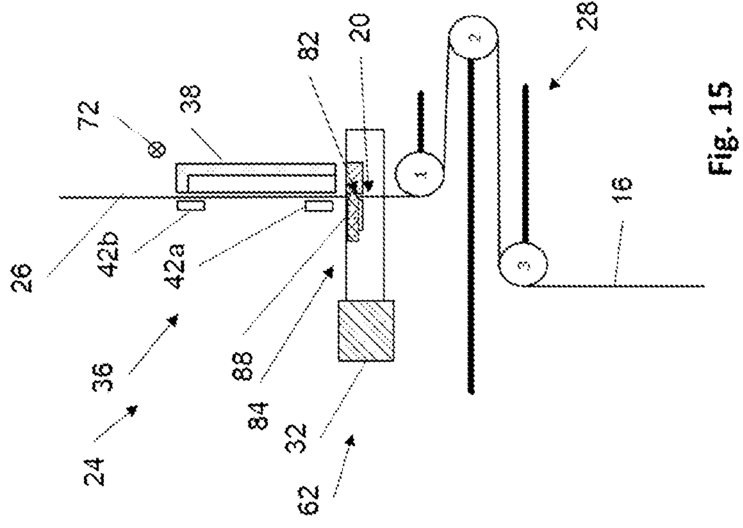
FIG. 15 is a view similar to FIG. 14, wherein the separator is separated by means of the holding and separating device.
Figure 14:
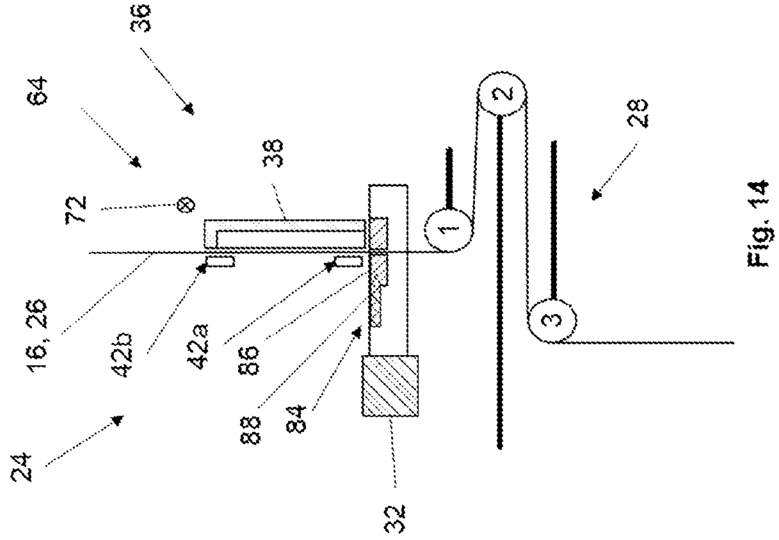
FIG. 14 is a view similar to FIG. 13, during separation, the separator being clamped with the holding and separating device and with a holding element of the stacking device.
Figure 13:
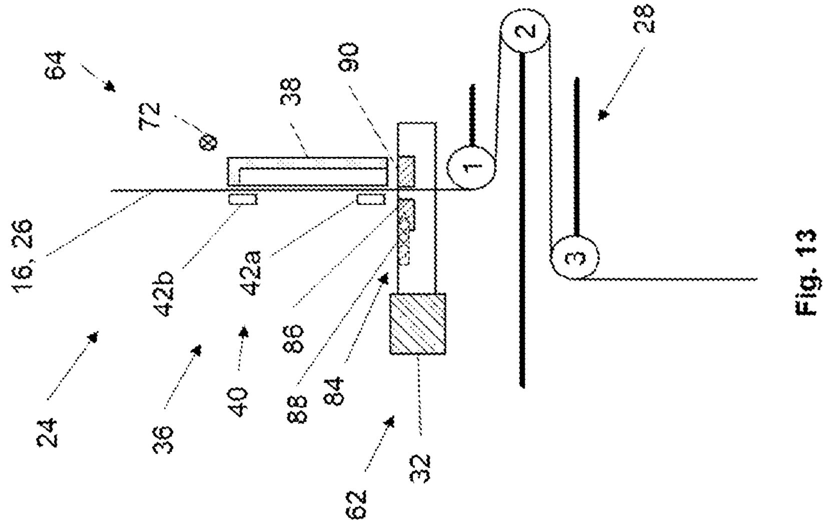
FIG. 13 is a front view of the stacking device, of a holding and separating device and of the separator buffer storage of the apparatus at the beginning of a step of separating the separator when the separator buffer storage is filled.
Figure 16:
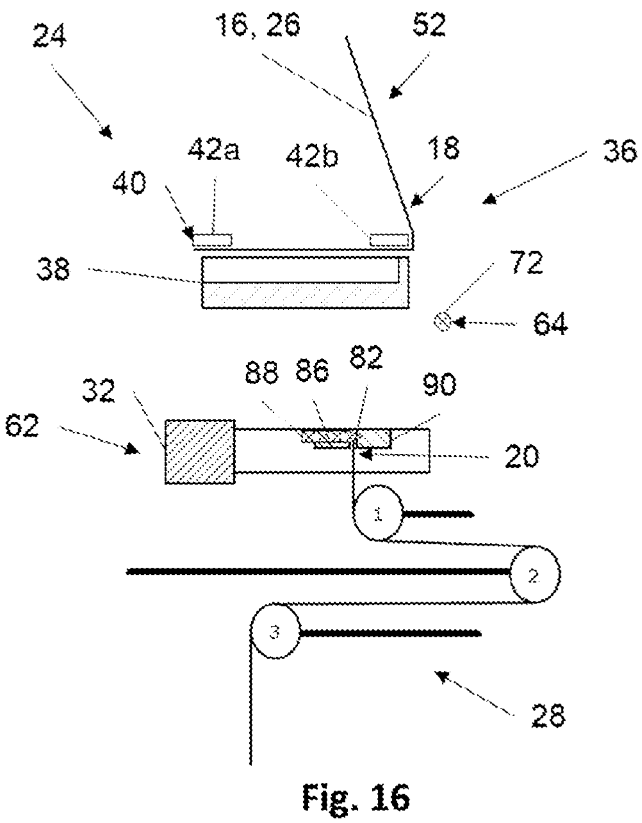
FIG. 16 is a view similar to FIG. 15, wherein the stacking device has been transferred to a stacking position for stacking a new cell stack and wherein a new process is started.

Here, FIG. 13 shows a front view of the stacking device 36, the separating and holding device 62 and the separator buffer storage 28 of the apparatus 24 at the beginning of step eb) of separating the separator 16 with the separator buffer storage 28 filled. FIG. 14 shows a view similar to FIG. 13 shortly before the actual separation, wherein the separator 16, viewed in the conveying direction of the separator 16, is clamped before a separation point 82 with the separating and holding device and after the separation point 82 with the hold-down fingers 42*a*, 42*b* of the holding elements 40 of the stacking device 36. FIG. 15 shows a view similar to FIG. 14, wherein the separator 16 is separated by means of the separating and holding device 62 at the separating point 82. And FIG. 16 shows a view similar to FIG. 15, wherein the stacking device 36 is transferred to a stacking position for stacking a new cell stack and a new stacking process is started. For this purpose, the stacking table 38 is pivoted back into the horizontal stacking position by means of the pivoting device 64 about the axis of rotation 72. In this case, the separator 16 is already clamped by means of the holding fingers 42*a*, 42*b* as explained above for FIG. 3, so that the stacking process of the new cell stack 10 can be started immediately as previously explained with reference to FIGS. 2 to 5.

Accordingly, in the method illustrated herein, step e) comprises the step:

e) severing the separator web 26 at the trailing end 20, in the conveying direction, of the length portion 58 or supply 56 and holding the severing point 82 in the region of the trailing end 20 by means of the separating gripper 32.

Accordingly, the separating and holding device 62 is configured to hold the separation point 82 at the trailing end 20. The separating and holding device 62 is further movable to feed the separation point 82. For this purpose, the separating gripper 32 is movable by means of actuators which are not shown in greater detail and, like all the units explained here, can be controlled by the control unit 34, and it has a cutting device 84 for severing the separator web 26 and gripping elements, in particular in the form of a clamping bar 86 with an abutment 90, for holding the separator web 26 as well as the end 20 of the separator web 26 which has been cut off at the separation point 82.

The function of the separating and holding device 62 and a preferred embodiment of step eb) of separating the separator and starting the new stacking process are explained again below with reference to FIGS. 13 to 16.

After the separator buffer storage has been filled as explained above for FIGS. 11 and 12, the separator web 26 can be severed via the separating gripper 32. In the embodiments shown, this is done as close as possible to the stacking table 38, since the upper end (in the new cell stack 10) should preferably be very short.

For this purpose, the separator gripper 32 fixes the separator 16 below a cutting edge 88 of the cutting device 84 via the clamping bar 86. This clamping bar 86 is pushed via a pneumatic cylinder and is leading the cutting edge 88 in a resilient manner. At the upper end, the separator 16 is also fixed via the hold-down fingers 42*a*, 42*b*, which clamp the separator 16 on the stacking table 38 for the separation process. The cut is thus made between the fixation on the stacking table 38 by the hold-down fingers 42*a*, 42*b* and the clamping bar 86 in the separator gripper 32, so that both loose ends of the separator web 26 continue to be fixed after the cut.

After the cut has been made, the upper end of the separator web 26 is fixed on the stacking table 38 (by means of the hold-down fingers 42*a*, 42*b*), and the lower end 20 is held in the separating gripper 32 via the clamping bar 86.

Parallel to the wrapping process (step f)), which will be explained in more detail below, the stacking table 38 can now be flipped back into the horizontal position and a new stacking process can be started.

The individual steps of step eb) just mentioned are shown schematically in FIGS. 13 to 16.

Subsequently, while stacking is again carried out for the subsequent cell stack 10, step f) of wrapping the previously stacked cell stack 10 is carried out. One embodiment of step f) of wrapping and one embodiment of the wrapping device 54 provided for carrying out the step f) in the apparatus 24 are explained in more detail below with reference to the illustration of FIGS. 17 to 25.

Referring to FIGS. 17 to 25, the wrapping device 54 comprises at least one rotatable wrapping gripper 92 for gripping the cell stack 10 and rotating the cell stack 10 to wrap the separator web 26 therearound. In the illustrated embodiment, the wrapping gripper 92 includes at least one fork-shaped gripping member 94-1, 94-2 having a first tine and a second tine. The single tine will be referred to herein as the wrapping blade 96*a* to 96*d*. In the illustrated embodiment, a wrapping unit 93 of the wrapping device 54 comprises a first fork-shaped gripping element 94-1 having a first pair of tines in the form of a first wrapping blade 96*a* and a second wrapping blade 96*b*, and a second fork-shaped gripping element 94-2 having a second pair of tines in the form of a third wrapping blade 96*c* and a fourth wrapping blade 96*d*.

Further, the wrapping device 54 comprises a web tensioning unit 98 for adjusting, maintaining, regulating and/or controlling the web tension of the separator web 26 during wrapping.

According to preferred embodiments, step f) of wrapping comprises in particular the following sub-steps:

f1) gripping the cell stack with the wrapping gripper 92, f2) rotating the cell stack to wrap the separator web around it, in particular by rotating the wrapping gripper 92, f3) adjusting, maintaining, regulating and/or controlling the web tension of the separator web 26 during wrapping, and/or f4) elastic tensioning of the separator web 26, f5) emptying the separator buffer storage 28 containing the supply 56 of the separator web 26 for wrapping, and f6) feeding a support for the separation point 82 of the separator web, here in particular the separating and holding device 62 and more particularly the separating gripper 32 with the clamping strip 86 clamping the separation point 82 is fed.

Figure 17:
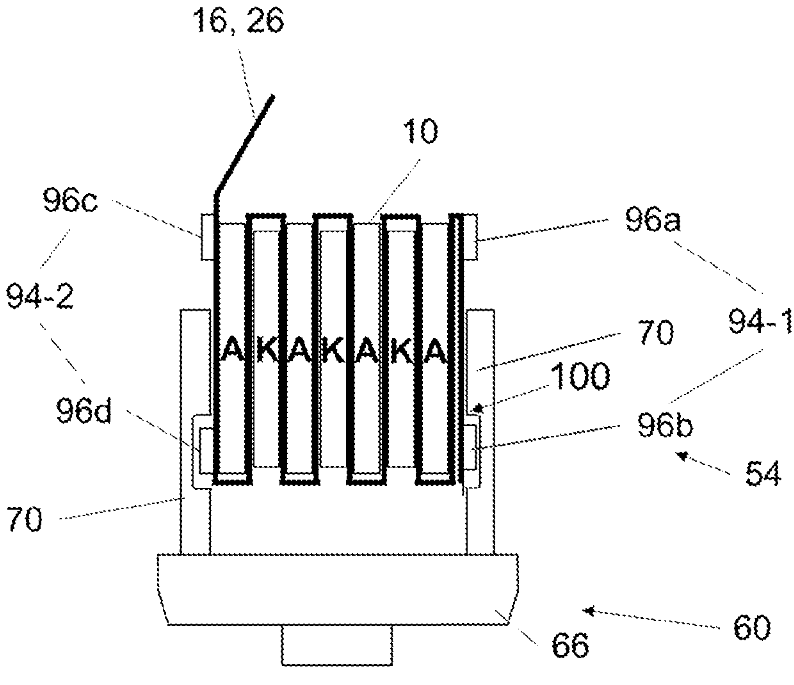
FIG. 17 is a lateral view of the cell stack held by the transfer gripper during the transfer to the wrapping device which comprises fork-like gripper elements with wrapping swords arranged as pairs of tines, wherein the gripper elements are inserted from behind.

In detail, FIG. 17 shows a side view of the cell stack 10 still held by the transfer gripper 66 during transfer to the wrapping device 54, which has the fork-shaped gripping elements 94-1, 94-2 with the wrapping blades 96*a* to 96*d* arranged as pairs of tines, the fork-shaped gripping elements 94-1, 94-2 being inserted from behind. FIG. 17 shows the position of the wrapping blades 96*a* to 96*d* between the cell stack 10 and the transfer gripper 66. The gripper fingers 70 have an overlap 100 so that the wrapping blades 96*a* to 96*d* can each be inserted laterally of the gripping surfaces of the gripper fingers 70.

Figures 18, 19, 20:
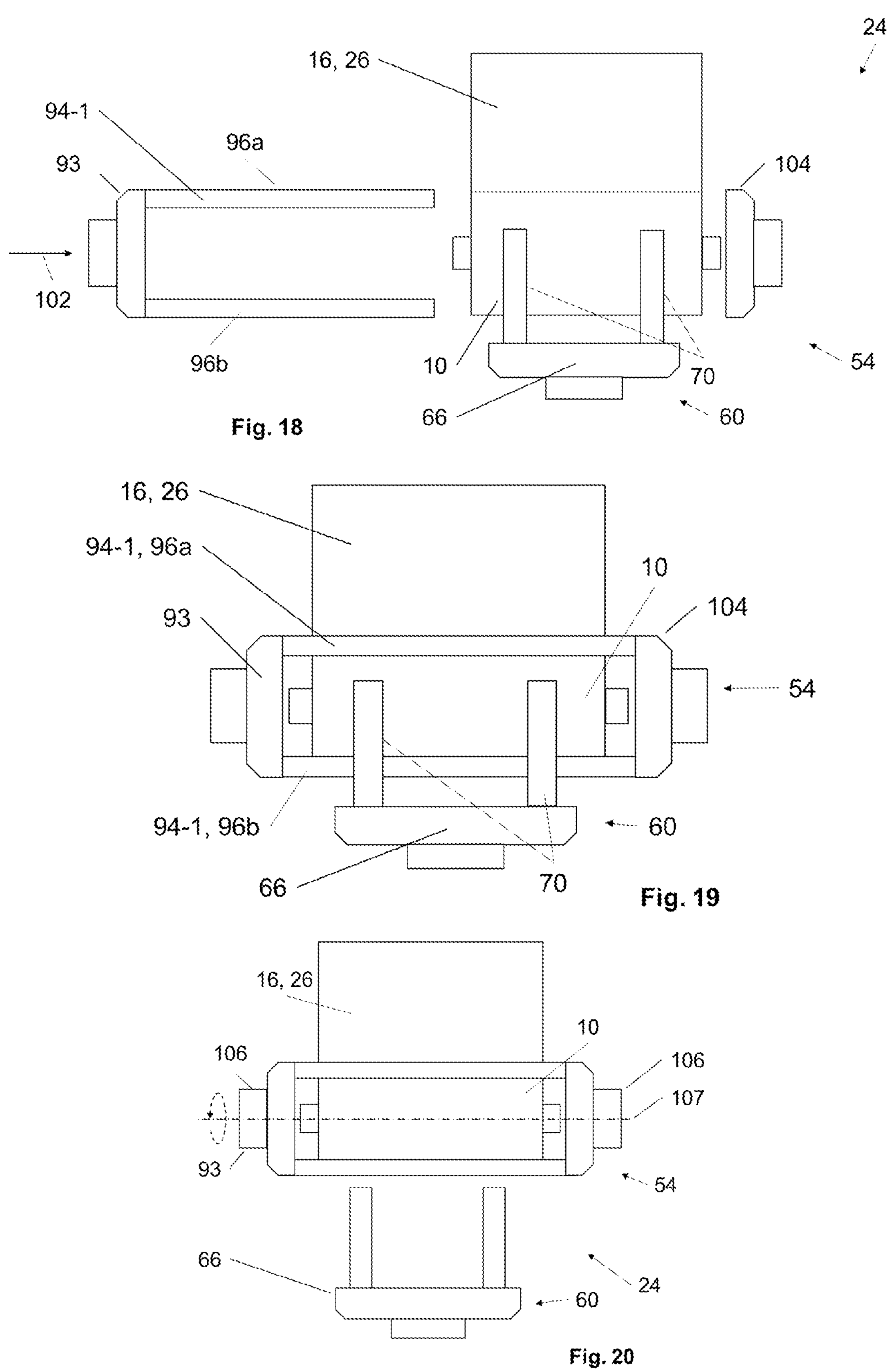
FIG. 18 is a front view of the situation shown in FIG. 17; the fork-like gripper elements move in horizontally, the pairs of tines of the fork-like gripper elements being horizontal.
FIG. 19 is a view similar to FIG. 18, with the gripper elements fully moved in and fixed by clamping in order to clamp the cell stack between them.
FIG. 20 is a view similar to FIG. 19, with the transfer gripper removed and the wrapping device starting to rotate the clamped cell stack for wrapping.

FIG. 18 shows a front view of the situation shown in FIG. 17; the fork-shaped gripping elements 94-1, 94-2 move in horizontally from the side by means of a feed axis 102, with the pairs of tines—first and second wrapping blades 96*a*, 96*b* and third and fourth wrapping blades 96*c*, 96*d*—of the fork-shaped gripping elements 94-1, 94-2 being horizontal. The fork-shaped gripping elements 94-1, 94-2 can be moved towards and away from each other under the control of the control unit 34. FIG. 18 shows a basic position of the wrapping unit 93 for picking up and delivering the cell stack 10. Further, the transfer gripper 66 is still engaged with the cell stack 10 to clamp it. Also shown is a clamping 104 for the free ends of the wrapping blades 96*a*-96*d*, which clamping can be controlled by the control unit for adjustment.

FIG. 19 shows a view similar to FIG. 18, with the fork-shaped gripping elements 94-1, 94-2 fully moved in and fixed via the clamping 104 to clamp the cell stack 10 between them. FIG. 19 shows the working position of the wrapping unit 93.

FIG. 20 shows a view similar to FIG. 19, with the transfer gripper 66 transferred to its home position and thus removed from the wrapping unit 93, and with the wrapping device 54 starting to rotate the cell stack 10 now clamped in the wrapping unit 93 for wrapping. The wrapping unit 93 has pivot bearings 106 and is drivable to rotate about its central axis, which is horizontal in FIG. 20, as the axis of rotation 107. As mentioned above, all actuators of the wrapping unit 54 are controlled accordingly by the control unit 34.

Figure 21:
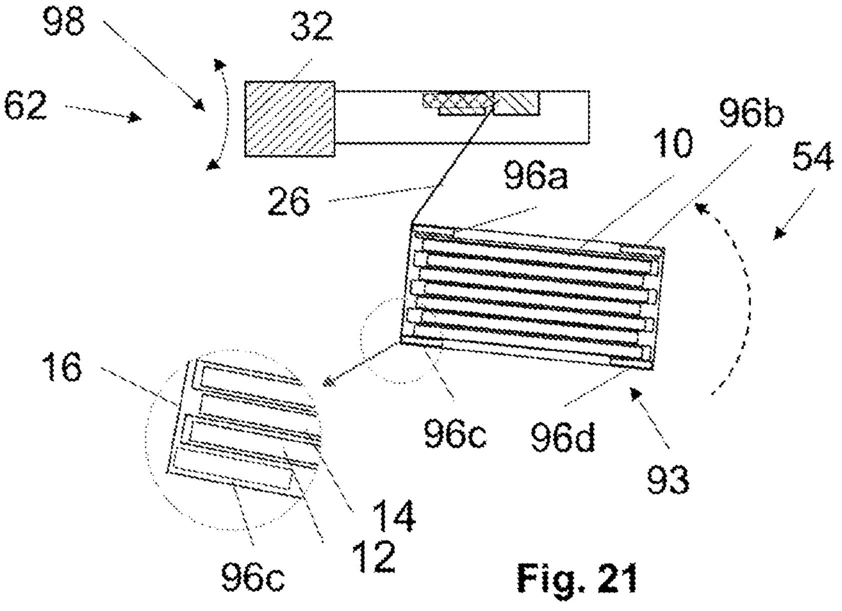
FIG. 21 is an overall presentation and a detailed presentation, with a view from the axial side to the wrapping device during the rotation while the separating and holding device are fed.

FIG. 21 shows an overall view and a detailed view from the axial side of the wrapping device 54 during rotation, with the separating gripper 32 with the end 20 held thereon of the separator web 26 separated at the separation point 82 being fed. In the process, the wrapping blades 96*a* to 96*d* are wrapped.

Figure 22:
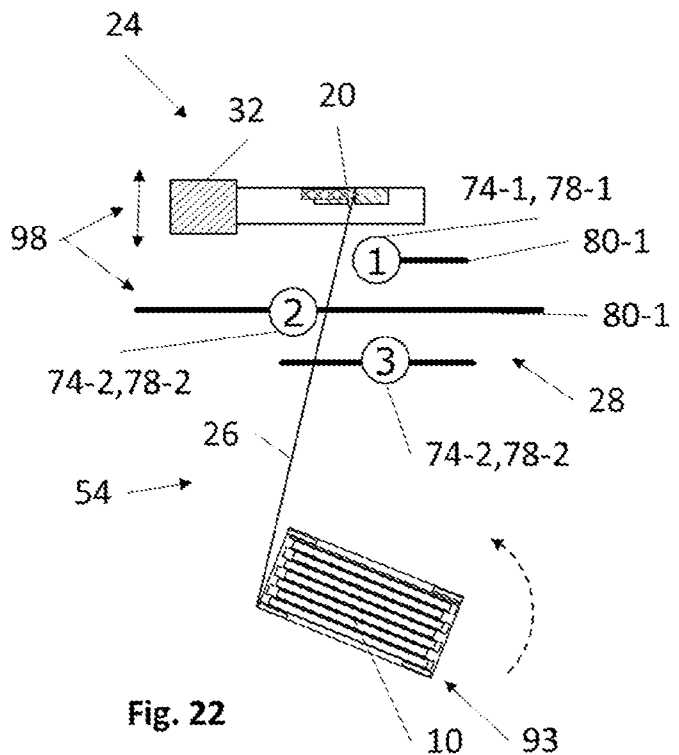
FIG. 22 is an axial lateral view to a rotating wrapping unit during a retraction of the separator buffer storage which together with the separating and holding device forms a web tensioning unit for maintaining the web tension during wrapping.

FIG. 22 shows an axial lateral view of the rotating wrapping unit 93 during a repositioning of the separator buffer storage 28, which together with the separator gripper 32 forms elements of the web tensioning unit 98 for maintaining the web tension during wrapping.

Figure 23:
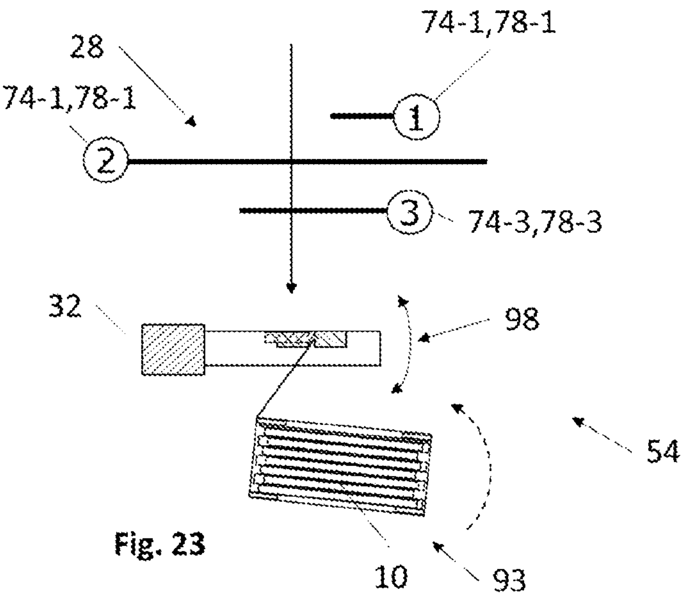
FIG. 23 is a view similar to FIG. 22, wherein the deflection rollers of the separator buffer storage are moved out of the way of the separating and holding device in order to feed the supply of the separator.

FIG. 23 shows a view similar to FIG. 22, with the deflection rollers 74-1 to 74-3 of the separator buffer storage 28 moved out of the path of the separator gripper 32 for feeding the supply 56 of the separator 16.

Figure 24:
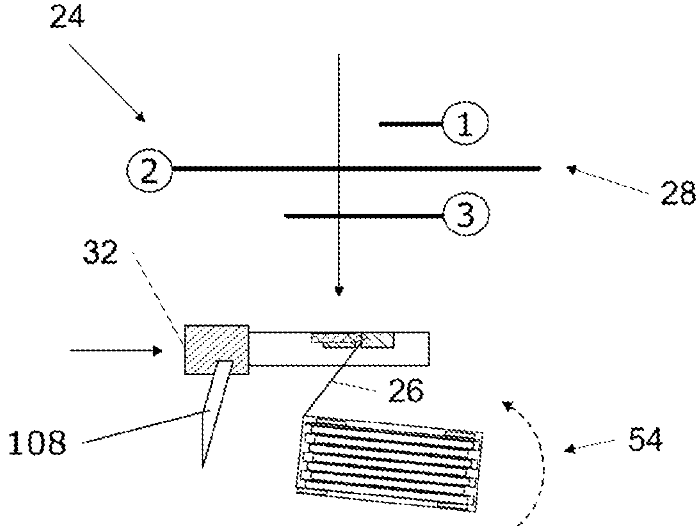
FIG. 24 is a view similar to FIG. 23, showing a transverse movement of the separating and holding device for applying the free end of the separator web against the cell stack.

FIG. 24 shows a view similar to FIG. 23, wherein a transverse movement of the separating and holding device 62 for applying the free end of the separator web against the cell stack 10 is shown. Here, a transverse movement of the separator gripper 32 is initiated via a cam 108 or via an actuator (not shown) during lowering of the separator gripper 32 onto the cell stack 10.

Figure 25:
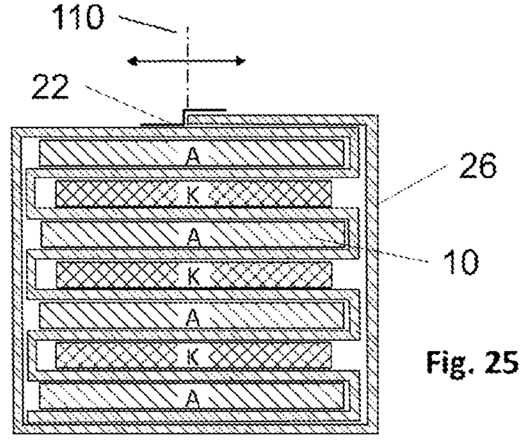
FIG. 25 is a view similar to FIG. 1, illustrating the position of a butt edge or an adhesive strip on the cell stack 10.

FIG. 25 shows a view similar to FIG. 1 to illustrate the position 110 of the butt edge or adhesive strip 22 on the cell stack 10. The transverse movement of the separating gripper 32 is performed accordingly to achieve this desired position.

In detail, step f) of wrapping the cell stack 10 is performed as follows. After the separator 16 has been separated, the wrapping process can be performed in parallel with the stacking process of the new cell stack 10 in the main time. This means that the stacking process of Z-folding can now be started again on the stacking table 38, as described above for FIGS. 1 to 6, and simultaneously wrapping is carried out, as described below.

For this purpose, the cell stack 10 is transferred from the transfer gripper 66 to the wrapping unit 93. The gripper fingers 70 of the transfer gripper 66 are designed in such a way that the wrapping unit 93 can move in laterally between the cell stack 10 and the transfer gripper 66, see FIG. 17.

As soon as the wrapping unit 93 is positioned, the cell stack 10 is gripped between the so-called wrapping blades 96*a* to 96*d*. For this purpose, the wrapping blades 96*a* to 96*d* are moved in from one side via the infeed axis 102 (i.e. actuator for infeed here) and then clamped on this side and on the opposite side (working position); preferably, the clamping is performed synchronously.

The wrapping blades 96*a* to 96*d* are designed in such a way that the separator 16 is not folded over the sensitive electrode edges. Thus, the wrapping blades 96*a* to 96*d* take up the force and fix the cell stack 10 simultaneously, see FIGS. 18 to 21.

The transfer of the cell stack 10 takes place in the vertical position of the fork-shaped gripping elements 94-1, 94-2, see FIGS. 17 to 20. The wrapping blades 96*a* to 96*d*, which are flat in cross-section, are also aligned vertically during moving in. This has the great advantage that the wrapping blades 96*a* to 96*d* also enter the cell stack 10 in the vertical position. Because of the vertical orientation, the flat wrapping blades 96*a* to 96*d* are thus more rigid than in the horizontal position.

After the cell stack has been fixed between the wrapping blades 96*a* to 96*d*, the transfer gripper 66 releases and repositions again downwards.

The wrapping process then starts, see FIGS. 20 and 21, with the separator 16 being wrapped around the outside of the wrapping blades 96*a* to 96*d*. This ensures that the sensitive electrode edges are not damaged.

For wrapping, the required material is fed from the separator buffer storage 28 in the first step, i.e. the rollers 78-1 to 78-3 move back to their home position, compare FIG. 11.

As soon as the rollers 78-1, 78-3 have moved out of the way, the remaining separator web 26 is fed by lowering the separating gripper 32, see FIG. 23.

One embodiment of the web tensioning unit 98 is explained below. In order to keep the web tension constant during the entire wrapping process, the separator gripper 32 has an additional rotary bearing. The counterforce for maintaining the web tension can be variably adjusted via a mechanical or pneumatic spring (explained in more detail later).

In the lower area of the vertical axis (movement mechanism for vertical movement of the separating gripper), the separating gripper 32 also performs a horizontal transverse movement via the cam 108 (or a separate actuator) in addition to the vertical stroke movement. This can ensure that the separation point 82 can be positioned centrally (or according to customer requirements) on the cell stack, see FIGS. 24 and 25.

In the following, with reference to FIGS. 26 to 28, the further step:

g) fixing the separation point 82 of the separator web 26 to the wrapped cell stack 10 as well as the units provided for this purpose in the device 24 will be explained in more detail.

Figure 26:
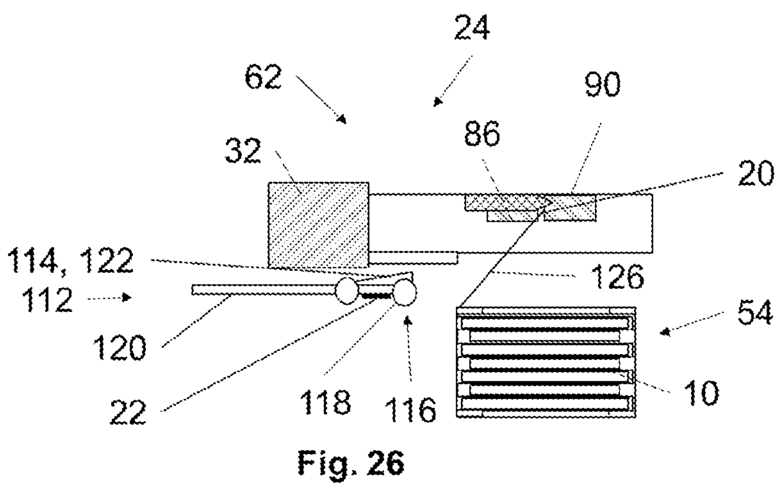
FIG. 26 is a schematic representation of the cell stack with the separating gripper and a positioning and fixing unit for positioning and fixing one end of the separator to the cell stack, with the positioning and fixing unit being shown in the basic position.
Figure 27:
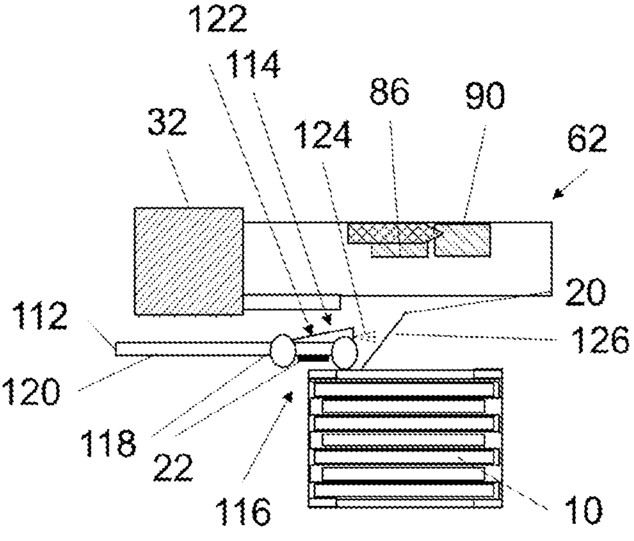
FIG. 27 is a view similar to FIG. 26, showing the positioning and fixing unit when unrolling the separator.
Figure 28:
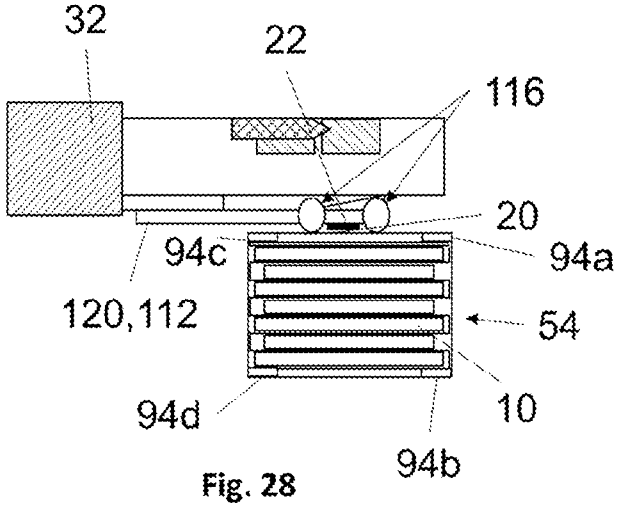
FIG. 28 is a view similar to FIG. 26, showing the positioning and fixing unit when pressing on a fixing means, in particular an adhesive strip, to fix the end.

According to FIGS. 26 to 28, the apparatus 24 comprises a positioning and/or fixing unit 112 for positioning and/or fixing the end portion 126 of the separator web 26 to the wrapped cell stack 10, preferably by means of applying at least one fixing agent such as in particular the adhesive strip 22. Further, the apparatus 24 comprises a fluid flow applicator unit 114 for applying a fluid flow to the end region 126 at the end 20 of the separator web 26 to prevent folds. Further, the apparatus 24 comprises a smoothing unit 116 for smoothing the end region 126 of the separator web 26, preferably by means of at least one roller 118 or a leading round element, or alternatively or additionally by means of a smoothing surface (not shown).

In the embodiment shown, the positioning and fixing unit 112 is designed as an application gripper 120 which can be controlled by the control unit 34. The application gripper 120 is configured to perform the following movements and functions. An air blade 122 is provided on the application gripper 120 as a fluid flow applicator unit 114, by means of which an air flow 124 can be applied to the end region 126. Further, a plurality of cylinder-shaped rollers 118 of the smoothing unit 116 are provided on the application gripper 120. The application gripper 120 may further cooperate with a dispensing unit having a supply of adhesive strips 22, for example having an adhesive strip roller and cutting device (not shown), to receive at least one adhesive strip 22 at a time.

In the illustrated embodiment of the method, step g) includes the following steps:

g1) holding the separation point 82 of the separator web 26 by means of the downstream separating gripper 32, which—as explained above—is designed to separate the separator web 26 and hold the separation point 82;

g2) applying a fluid flow—here air flow 124—to prevent folds;

g3) smoothing the end region 126 of the separator web 126 by means of the at least one roller 118;

g4) fixing the end region 126 of the separator web 26 to the wrapped cell stack 10 by applying the at least one adhesive strip 22; and g5) transferring the wrapped cell stack 10 to subsequent processes, preferably with cell components 12, 14 substantially vertically aligned.

More specifically, FIG. 26 shows a schematic view of the wrapped cell stack 10 with the separating gripper 32 holding the end 20 and the positioning and fixing unit 112 with the application gripper 120 for positioning and fixing the end 20 of the separator 16 to the cell stack 10, wherein the application gripper 120 is shown in the home position. The separation point 82 of the separator 16 is still clamped in the separating gripper 32. FIG. 27 shows a view similar to FIG. 26, with the application gripper 120 shown unrolling the separator 26. The separating gripper 32 releases the separation point 82 (the cutting edge 88 with the clamping bar 86 have moved away from the abutment 90), and the application gripper 120 neatly positions the end region 126 without folding or bending over. FIG. 28 shows a view similar to FIG. 26, with the application gripper 120 shown pressing on the adhesive strip 22 to secure the end 20. The process shown accordingly is as follows:

Parallel to the wrapping operation, the application gripper 120 pulls an adhesive strip 22 from a dispensing unit.

The application gripper 120 is designed to have additional rollers 118 at the front end, which neatly apply the end 20 of the separator 16 to the cell stack 10. In addition, the positioning and fixing unit 112 is spring-mounted so that the application gripper 120 can compensate for differences in height (e.g., when passing over the wrapping blades). Furthermore, the air blade 122 is integrated, which, when the clamping of the separator 16 in the separating gripper 32 is released, prevents the separator 16 from folding or causing misalignment of the edge (end 20) due to, for example, buckling.

At the end of the wrapping process, the separating gripper 32 opens the clamping of the separator 16 and the free end 20 is then pressed onto the cell stack 10 via the application gripper 120, see FIGS. 17 and 28.

As soon as the application gripper 120 is in the end position, the lifting axis (actuator for lifting and lowering) of the separating gripper 32 presses the application gripper 120 and thus also the tape (example for adhesive strip 22) onto the cell stack 10, see FIG. 28. Now the separator 16 is fixed.

Finally, the cell stack 10 is gripped again by the transfer gripper 66, the wrapping blades 96*a*-96*d* are pulled out laterally and the cell stack 10 can be transferred to downstream processes.

This removal of the cell stack 10 from the wrapping unit 93 is also carried out in a vertical orientation, as is the loading of the cell stack 10 into the wrapping unit 93.

The separating gripper 32 can be designed in quite different ways. In the following, a possible specific embodiment is explained in more detail with reference to the illustrations in FIGS. 29 to 31.

As explained above, the separating gripper 32 has the cutting device 84 for severing the separator web 26 and gripping elements for holding the separation point 82.

The cutting device 84 has a cutting edge 88 and a drive unit comprising, for example, a pneumatic cylinder 128 for moving the cutting edge 88 to sever the separator web 26.

The one gripping element, which in the embodiments shown is formed as a clamping bar 86, is leading the cutting edge 88 in a resilient manner. For this purpose, a compression spring 130 is provided on the movable cutting edge 88 for the separator clamping. The clamping bar 86 moves with the cutting edge 88 and is preloaded relative to the latter in the direction of the abutment 90 by means of the compression spring 130.

For example, the cutting edge 88 is designed as a cutting knife, e.g., as a plate with a cutting edge running obliquely in this case, and is mounted on a guide 132 so as to be displaceable by the pneumatic cylinder. One end of the compression spring 130 is supported on the cutting knife or an element firmly connected thereto—e.g., a knife holder. The other end is supported on the clamping bar 86, which is also mounted on the guide 132 so as to be displaceable parallel to the cutting knife. During cutting, the clamping bar 86 is leading the cutting edge 88 until it abuts against the abutment 90 with the separator web 26 between them, thus clamping the separator web 26 against the abutment 90. Further movement of the pneumatic cylinder 128 then advances the cutting edge 88 against the compressive stress of the compression spring 130 to sever the separator 16. After the severing process, the separation point 82 remains clamped between the clamping bar 86, which is acted upon by the compression spring 130, and the abutment 90 under the pressure of the compression spring 130 and is thus held in place. Thus, the cutting edge 88 is movable for holding and severing in the direction of a further gripping element formed as an abutment 90, in order to fix the separator web 26 between the spring-loaded upstream gripping element—in this case, for example, the clamping bar 86—and the abutment 90 and to sever it by further movement of the cutting edge 88.

Figure 29:
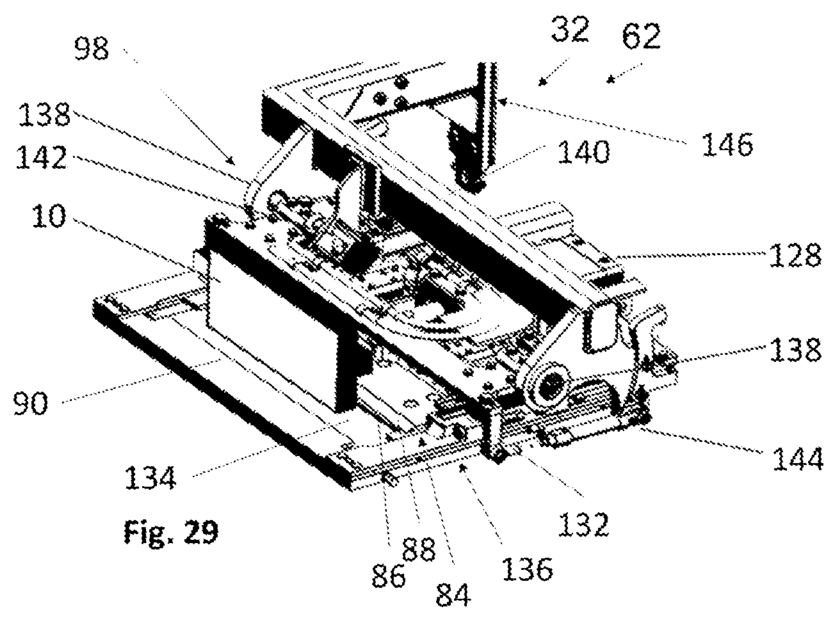
FIG. 29 is a perspective view of a specific possible embodiment of the separating gripper during the transfer of the cell stack from the stacking to the wrapping stage.
Figure 30:
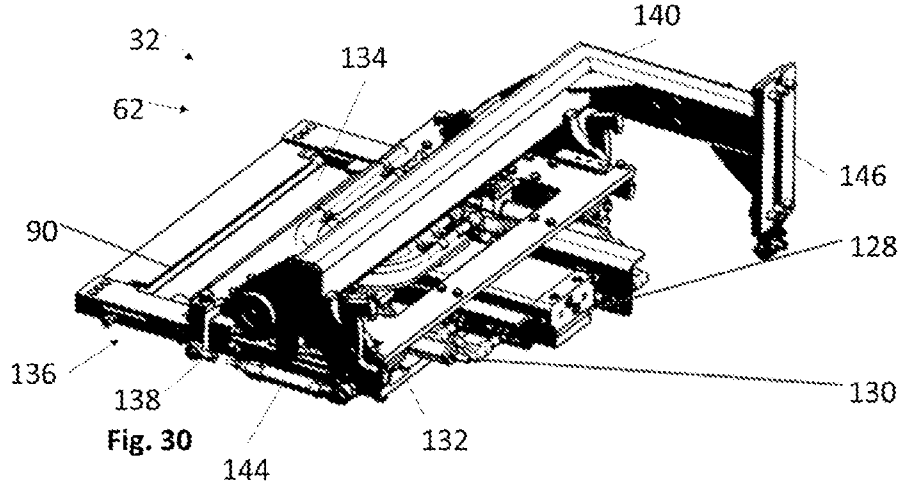
FIG. 30 is a further perspective view of the separating gripper.
Figure 31:
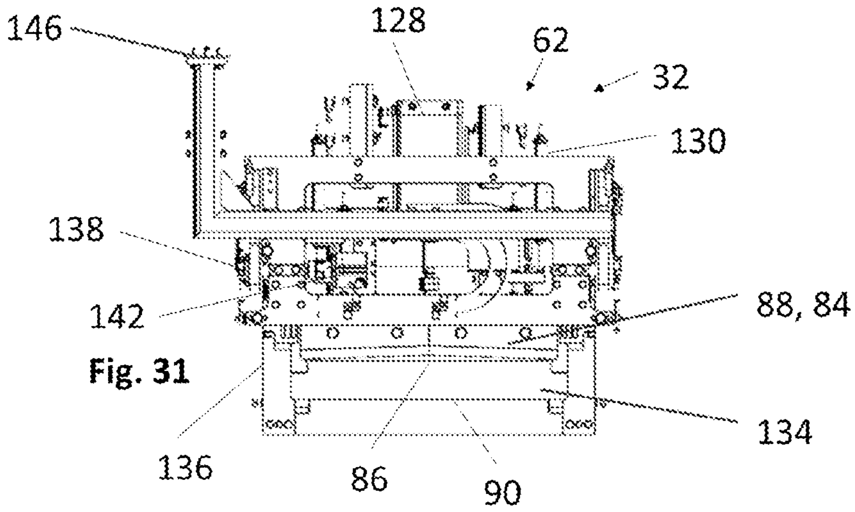
FIG. 31 is a top view of the separating gripper.

FIGS. 29 to 31 show the basic position and thus the transfer position of the separating gripper 32 for carrying out the transfer of the cell stack 10 from stacking to wrapping shown in FIGS. 10 to 12. In the transfer position, the cutting edge 88 with the clamping bar 86 and the abutments 90 are separated from each other to such an extent that an opening 134 is formed therebetween through which the transfer gripper 66 with the cell stack 10 can dive.

As noted above, a preferred embodiment of the separator gripper 32 has an additional rotary bearing and further preferably a preloading means for preloading the separating gripper 32 in one of the directions of rotation of the rotary bearing to keep a web tension of the separator web 26 held on the separating gripper 32 constant during wrapping.

For this purpose, the unit comprising the guide 132 for the cutting edge 88 and the gripping element movable in a leading manner therewith and the drive unit (in this case the pneumatic cylinder 128) is formed, for example, as a rocker 136 which is rotatably mounted on a separator gripper support 140 by means of a rotary joint 138. The abutment 90 is also arranged on the rocker 136 at a distance from the pivot joint 138, so that a pull on the separator web held between the gripper elements exerts a torque on the rocker 136.

A rotary encoder 142 is disposed at the pivot joint 138, the signal from which provides a measure of web tension to the control unit 34.

Preferably, a spring balancer 144 is provided for the rocker 136 to form the pre-loading device. For example, the spring balancer 144 includes another pneumatic cylinder supported between the rocker 136 and the separating gripper support 140. The pneumatic cylinder is an example of a mechanical or pneumatic spring. Thus, when the web tension is greater, the rocker is deflected more, and when the web tension is less, which is sensed by the encoder, the rocker is deflected less. In one embodiment, the control unit 34 controls the stroke axis (motion apparatus/actuators) of the separating gripper 32 when it is fed, depending on the signal from the encoder, and thus controls the web tension. In some embodiments, the pressure in the further pneumatic cylinder may additionally or alternatively be controlled by the control unit 134, for example depending on the signal from the rotary encoder 142.

Thus, the web tensioning unit preferably comprises the rocker 136 having a rotary encoder 142 and a spring balancer 144.

The clamping bar 86 preferably has a rounded portion, which is not shown in more detail in the drawings, in order to gently support the separator web 26 even during movements of the rocker 136.

The control unit 34 is configured to control a movement of the separator gripper 32 such that the separator gripper 32 with the separation point 82 of the separator web 26 held thereon is fed during wrapping and such that the web tension of the separator web 26 held by the separator gripper 32 is maintained, regulated and/or controlled during wrapping.

The separator gripper support 140 connects the pivot joint 138 with the rocker 136 mounted thereon to the lifting axis, i.e., a movement mechanism with actuators for raising and lowering the separator gripper 32. For this purpose, a corresponding connection 146 is provided on the separator gripper support 140 for connection to the lifting axis or to the cam 108 or other mechanism (e.g., actuators controlled by the control unit 34) for horizontal movement.

Thus, a preferred embodiment of the separating gripper 32 provides at least one or more or all of the following functions:

- an opening 134 through which the transfer gripper 66 together with the stack of cells 10 dips a rocker 136 for balancing the web tension with a pneumatic or mechanical spring regulation of the web tension via a rotary encoder 142 which is located on the gripper,
- a cutting device 84 with leading clamping for fixing the separator 16 pre-loading of the leading clamping via springs 130,
- the clamping bar 86 is also designed with a radius over which the separator 16 is guided when the rocker 136 deflects for web tension compensation (not shown) cam adjustment and stroke axis.

A method and apparatus (24) for producing Z-folded cell stacks (10) have been described for producing wrapped cell stacks in large series and more quickly and yet with process reliability. With this, first and second cell components (12, 14) are alternately stacked while a separator web (26) is inserted between them in a Z-shaped or meandering manner and is subsequently wrapped once again around the cell stack (10) thus obtained. The method and the apparatus are configured such that wrapping is performed at least partially in parallel on a previously obtained cell stack (10) while stacking for obtaining the next cell stack (10) is already being performed. For this purpose, a supply of the separator web (26) required for wrapping is provided in a separator buffer storage (28), is cut off and held at the trailing end in the conveying direction by means of a separating gripper (32), and is fed by means of the separating gripper (32) during wrapping.

The systems and devices described herein may include a controller or a computing device comprising a processing and a memory which has stored therein computer-executable instructions for implementing the processes described herein. The processing unit may comprise any suitable devices configured to cause a series of steps to be performed so as to implement the method such that instructions, when executed by the computing device or other programmable apparatus, may cause the functions/acts/steps specified in the methods described herein to be executed. The processing unit may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory may be any suitable known or other machine-readable storage medium. The memory may comprise non-transitory computer readable storage medium such as, for example, but not limited to, an electronic, magnetic, optical, electromagnetic, infrared, or semiconductor system, apparatus, or device, or any suitable combination of the foregoing. The memory may include a suitable combination of any type of computer memory that is located either internally or externally to the device such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. The memory may comprise any storage means (e.g., devices) suitable for retrievably storing the computer-executable instructions executable by processing unit.

The methods and systems described herein may be implemented in a high-level procedural or object-oriented programming or scripting language, or a combination thereof, to communicate with or assist in the operation of the controller or computing device. Alternatively, the methods and systems described herein may be implemented in assembly or machine language. The language may be a compiled or interpreted language. Program code for implementing the methods and systems described herein may be stored on the storage media or the device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein.

Computer-executable instructions may be in many forms, including modules, executed by one or more computers or other devices. Generally, modules include routines, programs, objects, components, data structures, etc., that perform particular tasks or implement particular abstract data types. Typically, the functionality of the modules may be combined or distributed as desired in various embodiments.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term “or” means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS

10 cell stack
12 first cell component
14 second cell component
16 separator
18 empty fold
20 free (trailing) end of separator
22 adhesive strip
24 apparatus
26 separator web
28 separator buffer storage
32 separator gripper
34 control unit
36 stacking device
38 stacking table
40 holding element
42*a* first hold-down finger (right)
42*b* second hold-down finger (left)
44 cathode magazine
46 cathode gripper
48 anode magazine
50 anode gripper
52 separator web insertion device
54 wrapping device
56 supply
58 length portion
60 transfer device
62 separating and holding device
64 pivoting device
66 transfer gripper
68 gripper groove
70 gripper finger (of the transfer gripper)
72 rotation axis
74-1 first deflection roller
74-2 second deflection roller
74-3 third deflection roller
76 loop
78-1 upper deflection roller
78-2 storage roller
78-3 lower deflection roller
80-1 first displacement guide
80-2 second displacement guide
80-3 third displacement guide
82 separation point
84 cutting device
86 clamping bar
88 cutting edge
90 abutment
92 wrapping gripper
93 wrapping unit
94-1 first fork-shaped gripping element (with first pair of tines)
94-2 second fork-shaped gripping element (with second pair of tines)
96*a* first wrapping blade
96*b* second wrapping blade
96*c* third wrapping blade
96*d* fourth wrapping blade
98 web tensioning unit
100 overlap
102 infeed axis
104 clamping
106 rotary bearing
107 rotation axis
108 cam plate
110 position of the butt edge
112 positioning and fixing unit
114 fluid flow applicator unit
116 smoothing unit
118 roller
120 application gripper
122 air blade
124 air flow
126 end region
128 pneumatic cylinder (cutting device/clamping unit)
130 pressure spring (for separator clamping)
132 guide
134 opening
136 rocker
138 rotary joint
140 separator clamp support
142 rotary encoder
144 spring balancer
146 connection
A anode
K cathode

The invention claimed is:

1. A method for manufacturing Z-folded cell stacks, the method comprising:

a) providing first and second cell components and providing a separator web, b) alternately stacking the first and second cell components while interposing said separator web in a Z-shape or meandering manner such that said separator web is folded around a previously placed cell component on a first side and then around a subsequently placed cell component on a second side opposite the first side to thus obtain a cell stack;

d) providing a length portion of the separator web in a separator buffer storage, the separator buffer storage comprising forming a loop of the separator web by means of a plurality of deflection rollers which are movable relative to each other wherein the length portion has a variable length adjusted by relative movement of the plurality of deflection rollers;

e) severing the separator web at a trailing end in a conveying direction of the length portion with a movable separating gripper and holding a separation point in a region of the trailing end with the separating gripper; and f) wrapping the length portion of the separator web provided in step d) around the cell stack obtained in step b), with the separation point being fed with the separating gripper holding the length portion, to provide a wrapped cell stack;

wherein step f) is performed at least partially in parallel on a previously obtained cell stack while step b) is performed to obtain a next cell stack.

2. The method according to claim 1, wherein step e) at least comprises:

e1) moving a first gripper element and a second gripper element of the separating gripper towards each other to engage the separator web in between and moving a cutting edge of the separating gripper relative to the first gripper element, the second gripper element, or both to severe the separator web; or e2) moving, towards the separator web, a holding and cutting unit of the separator gripper, said holding and cutting unit having a cutting edge and a gripping element designed as a clamping bar movable to the cutting edge and preloaded while leading the cutting edge, to hold the separator web between the gripping element and an abutment and to carry out severing while advancing the cutting edge via the gripping element resting against the abutment and the separator web; or both.

3. The method according to claim 1, wherein step f) at least comprises:

f1) tensioning the separator web;

f2) adjusting, maintaining, regulating, controlling, or a combination thereof, a web tension of the separator web during wrapping;

f3) elastically preloading the separating gripper for tensioning the separator web;

f4) variable adjustment of a counterforce for keeping a web tension constant during an entirety of the wrapping, at an additional rotary bearing of the separating gripper, via a mechanical or pneumatic spring; or any combination thereof.

4. The method according to claim 1, further comprising:

c) transferring the cell stack from a stacking device to a wrapping device;

wherein in step c) the cell stack is moved through between open gripper elements of the separating gripper.

5. The method according to claim 1, further comprising:

g fixing the separation point of the separator web to the wrapped cell stack;

g1) feeding the separation point to the wrapped cell stack with the separating gripper;

g2) applying a fluid flow to reduce folds;

g3) smoothing an end region of the separator web;

g4) fixing an end region of the separator web to the wrapped cell stack;

g5) transfer of the wrapped cell stack to downstream processes; or any combination thereof.

6. The method according to claim 1, wherein the cell stack is mechanically clamped at least during all transfers and movements until final fixation with a tape application after wrapping to maintain the position of the first and second cell components within the cell stack.

7. A non-transitory computer readable medium comprising a computer program comprising instructions causing an apparatus to perform the method according to claim 1.

* * * * *